US012697625B2

(12) United States Patent
Hayes et al.

(10) Patent No.: US 12,697,625 B2
(45) Date of Patent: *Aug. 4, 2026

(54) HYPER EFFICIENT SEPARATIONS DEVICE

(71) Applicant: ARIZONA BOARD OF REGENTS ON BEHALF OF ARIZONA STATE UNIVERSITY, Scottsdale, AZ (US)

(72) Inventors: Mark Hayes, Gilbert, AZ (US); Claire Crowther, Tempe, AZ (US); Paul Jones, Mesa, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 116 days.

This patent is subject to a terminal disclaimer.

(21) Appl. No.: 18/479,220

(22) Filed: Oct. 2, 2023

(65) Prior Publication Data

US 2024/0149275 A1 May 9, 2024

Related U.S. Application Data

(60) Continuation of application No. 17/400,419, filed on Aug. 12, 2021, now Pat. No. 11,806,729, which is a (Continued)

(51) Int. Cl.
*B03C 5/02* (2006.01)
*B01L 3/00* (2006.01)
(Continued)

(52) U.S. Cl.
CPC ........ *B03C 5/026* (2013.01); *B01L 3/502753* (2013.01); *B03C 5/005* (2013.01);
(Continued)

(58) Field of Classification Search
CPC ............ G01N 27/447; G01N 27/44791; B01L 3/502753; B01L 2400/0424; B01L 2400/086; B03C 5/005; B03C 5/026
See application file for complete search history.

(56) References Cited

U.S. PATENT DOCUMENTS 6,488,831 B1 12/2002 Hayes
6,890,411 B1 5/2005 Hayes
(Continued)

FOREIGN PATENT DOCUMENTS

WO 1999045377 A1 9/1999
WO 1999064851 A1 12/1999
(Continued)

OTHER PUBLICATIONS

Abdallah, B. G., et al. "Dielectrophoretic sorting of membrane protein nanocrystals." ACS nano 7.10 (2013): 9129-9137.
(Continued)

*Primary Examiner* — C. Sun
(74) *Attorney, Agent, or Firm* — Quarles & Brady LLP

(57) ABSTRACT

The present technology relates to improved device and methods of use of insulator-based dielectrophoresis. This device provides a multi-length scale element that provides enhanced resolution and separation. The device provides improved particle streamlines, trapping efficiency, and induces laterally similar environments. Also provided are methods of using the device.

10 Claims, 10 Drawing Sheets

Related U.S. Application Data division of application No. 16/324,324, filed as application No. PCT/US2017/046217 on Aug. 10, 2017, now Pat. No. 11,090,660.

(60) Provisional application No. 62/372,846, filed on Aug. 10, 2016.

(51) Int. Cl.
  *B03C 5/00* (2006.01)
  *G01N 15/10* (2024.01)
  *G01N 15/14* (2024.01)
  *G01N 27/447* (2006.01)

(52) U.S. Cl.
  CPC ..... *G01N 15/1023* (2024.01); *G01N 15/1484* (2013.01); *G01N 27/447* (2013.01); *G01N 27/44791* (2013.01); *B01L 2400/0424* (2013.01); *B01L 2400/086* (2013.01); *G01N 2015/1006* (2013.01)

(56) References Cited

U.S. PATENT DOCUMENTS

| | | | | |
|---|---|---|---|---|
| 7,678,256 | B2 * | 3/2010 | Davalos | ................. B03C 5/005 204/547 |
| 8,821,703 | B2 | 9/2014 | Hayes | |
| 9,185,356 | B2 | 11/2015 | Taylor | |
| 9,476,085 | B2 | 10/2016 | Taylor | |
| 9,938,330 | B2 | 4/2018 | Sierks | |
| 10,022,728 | B2 | 7/2018 | Hayes | |
| 2001/0023825 | A1 * | 9/2001 | Frumin | ............ G01N 27/44773 204/600 |
| 2003/0042140 | A1 | 3/2003 | Hayes | |
| 2004/0050435 | A1 | 3/2004 | Hayes | |
| 2005/0032051 | A1 | 2/2005 | Hayes | |
| 2007/0054316 | A1 | 3/2007 | Wiener | |
| 2007/0284254 | A1 | 12/2007 | Cho | |
| 2008/0213853 | A1 | 9/2008 | Garcia | |
| 2011/0174623 | A1 | 7/2011 | Harrold | |
| 2013/0286183 | A1 | 10/2013 | Taylor | |
| 2014/0091012 | A1 | 4/2014 | Ros | |
| 2014/0131204 | A1 | 5/2014 | Chou | |
| 2014/0371102 | A1 | 12/2014 | Hayes | |
| 2015/0056638 | A1 * | 2/2015 | Sierks | ..................... B03C 5/026 435/7.92 |
| 2015/0360237 | A1 | 12/2015 | Hayes | |

FOREIGN PATENT DOCUMENTS

| | | | |
|---|---|---|---|
| WO | 2000028315 | A1 | 5/2000 |
| WO | 2000028315 | B1 | 7/2000 |
| WO | 2001089985 | A2 | 11/2001 |
| WO | 2001098785 | A2 | 12/2001 |
| WO | 2001098785 | A3 | 12/2001 |
| WO | 2004081536 | A2 | 9/2004 |
| WO | 2007101174 | A2 | 9/2007 |
| WO | 2008124693 | A1 | 10/2008 |
| WO | 2009009028 | A1 | 1/2009 |
| WO | 2013148166 | A1 | 10/2013 |
| WO | 2014121226 | A2 | 8/2014 |
| WO | 2016057974 | | 4/2016 |

OTHER PUBLICATIONS

Abdallah, B. G., et al. "High throughput protein nanocrystal fractionation in a microfluidic sorter." Analytical chemistry 87.8 (2015): 4159-4167.

Allen, D. "Isomotive dielectrophoresis for parallel analysis of individual particles", Electrophoresis, Jun. 2017 [available online Jan. 2017], vol. 38, No. 11, pp. 1441-1449 DOI:10.1002/elps. 201600517.

Barbulovic-Nad, I., et al. "DC-dielectrophoretic separation of microparticles using an oil droplet obstacle." Lab on a Chip6.2 (2006): 274-279.

Barrett, L. et al., "Dielectrophoretic Manipulation of Particles and Cells Using Insulating Ridges in Faceted Prism Microchannels", Analytical Chemistry, Nov. 2005 (available online Sep. 2005), vol. 77, No. 21, pp. 6798-6804 DOI:10.1021/ac0507791.

Baylon-Cardiel, J. L., et al. "Prediction of trapping zones in an insulator-based dielectrophoretic device." Lab on a Chip9.20 (2009): 2896-2901.

Bhardwaj, J., et al. "Dry silicon etching for MEMS." Proc. Symp. Microstructures and Microfabricated Systems, ECS. 1997.

Braff, W. et al., "Dielectrophoresis-Based Discrimination of Bacteria at the Strain Level Based on Their Surface Properties", PLOS One, Oct. 2013, vol. 8, No., 10, e76751 (DOI:10.1371/journal.pone. 0076751).

Braff, W. et al., "High sensitivity three-dimensional insulator-based dielectrophoresis", Lab on a Chip, Feb. 2012, vol. 12, pp. 1327-1331 (DOI:10.1039/C2LC21212A).

Chaurey, V., et al. "Floating-electrode enhanced constriction dielectrophoresis for biomolecular trapping in physiological media of high conductivity." Biomicrofluidics 6.1 (2012): 012806.

Chen, K. P., et al. "Insulator-based dielectrophoretic separation of small particles in a sawtooth channel." Electrophoresis 30.9 (2009): 1441-1448.

Chou, C.-F., et al. "Electrodeless dielectrophoresis of single-and double-stranded DNA." Biophysical journal 83.4 (2002): 2170-2179.

Crane, J. S., et al. "A study of living and dead yeast cells using dielectrophoresis." Journal of the Electrochemical Society 115.6 (1968): 584-586.

Crowther, C. et al., "Refinement of insulator-based dielectrophoresis", Analyst, Apr. 2017, vol. 142, pp. 1608-1618 (DOI:10.1039/C6AN02509A).

Cummings, E. B. "Streaming dielectrophoresis for continuous-flow microfluidic devices." IEEE Engineering in Medicine and Biology Magazine 22.6 (2003): 75-84.

Cummings, E. B., et al. "Dielectrophoresis in microchips containing arrays of insulating posts: theoretical and experimental results." Analytical chemistry 75.18 (2003): 4724-4731.

Ding, J. et al., "Concentration of Sindbis virus with optimized gradient insulator-based dielectrophoresis", Analyst, Mar. 2016 [available online Feb. 2016], vol. 141, No. 6, pp. 1997-2008 (DOI:10.1039/c5an02430g).

European Patent Office, Extended European Search Report, Application No. 17840247.5, Feb. 27, 2020, 11 pages.

Gallo-Villanueva, R. C., et al. "DNA manipulation by means of insulator-based dielectrophoresis employing direct current electric fields." Electrophoresis 30.24 (2009): 4195-4205.

Gallo-Villanueva, R. C., et al. "Joule heating effects on particle immobilization in insulator-based dielectrophoretic devices." Electrophoresis 35.2-3 (2014): 352-361.

Gencoglu, A., "Chemical and morphological changes on platinum microelectrode surfaces in AC and DC fields with biological buffer solutions." Lab on a Chip 9.13 (2009): 1866-1873.

Gencoglu, A., et al. "Quantification of pH gradients and implications in insulator-based dielectrophoresis of biomolecules." Electrophoresis 32.18 (2011): 2436-2447.

Hoettges, K. F., et al. "Optimizing particle collection for enhanced surface-based biosensors." IEEE engineering in medicine and biology magazine 22.6 (2003): 68-74.

Huang, L. R., et al. "Continuous particle separation through deterministic lateral displacement." Science 304.5673 (2004): 987-990.

Hughes, M. P. "Strategies for dielectrophoretic separation in laboratory-on-a-chip systems." Electrophoresis 23.16 (2002): 2569-2582.

Hughes, M. P., et al. "Dielectrophoretic characterization and separation of antibody-coated submicrometer latex spheres." Analytical Chemistry 71.16 (1999): 3441-3445.

Hughes, M. P., et al. "Manipulation of herpes simplex virus type 1 by dielectrophoresis." Biochimica et Biophysica Acta (BBA)—General Subjects 1425.1 (1998): 119-126.

Humble, P. et al., "Electric Field Gradient Focusing of Proteins Based on Shaped Ionically Conductive Acrylic Polymer", Analyti-

(56)                 References Cited

OTHER PUBLICATIONS cal Chemistry, Oct. 2004 [available online Aug. 2004], vol. 76, No. 19, pp. 5641-5648 (10.1021/ac040055+).

Integrated Micro Materials. AZ Electronic Materials: AZ® 3300 Series Crossover Photoresists 2013.

International Search Report and Written Opinion for application PCT/US2017/046217, mailed on Oct. 24, 2017.

Johari, J., et al. "Dielectrophoretic assay of bacterial resistance to antibiotics." Physics in Medicine & Biology 48.14 (2003): N193.

Jones, P. V., et al. "Biophysical separation of *Staphylococcus epidermidis* strains based on antibiotic resistance." Analyst 140.15 (2015): 5152-5161.

Jones, P. V., et al. "Blood cell capture in a sawtooth dielectrophoretic microchannel." Analytical and bioanalytical chemistry 401.7 (2011): 2103.

Jones, P. V., et al. "Development of the resolution theory for gradient insulator-based dielectrophoresis." Electrophoresis 36.9-10 (2015): 1098-1106.

Jones, P. V., et al. "Differentiation of *Escherichia coli* serotypes using DC gradient insulator dielectrophoresis." Analytical and bioanalytical chemistry 406.1 (2014): 183-192.

Kang, K. H., et al. "Continuous separation of microparticles by size with Direct current-dielectrophoresis." Electrophoresis 27.3 (2006): 694-702.

Kang, Y., et al. "DC-Dielectrophoretic separation of biological cells by size." Biomedical microdevices 10.2 (2008): 243-249.

Keshavamurthy, S. S., et al. "Direct current dielectrophoretic characterization of erythrocytes: Positive ABO blood types." NSTI-Nanotech, Boston, MA (2008): 401-404.

Kwon, J.-S., et al. "Improvement of microchannel geometry subject to electrokinesis and dielectrophoresis using numerical simulations." Microfluidics and Nanofluidics 5.1 (2008): 23-31.

Lalonde, A., et al. "Effect of insulating posts geometry on particle manipulation in insulator based dielectrophoretic devices." Journal of Chromatography A 1344 (2014): 99-108.

Lapizco-Encinas, B. H., et al. "An insulator-based (electrodeless) dielectrophoretic concentrator for microbes in water." Journal of Microbiological methods 62.3 (2005): 317-326.

Lapizco-Encinas, B. H., et al. "Dielectrophoretic concentration and separation of live and dead bacteria in an array of insulators." Analytical chemistry 76.6 (2004): 1571-1579.

Lapizco-Encinas, B. H., et al. "Insulator-based dielectrophoresis for the selective concentration and separation of live bacteria in water." Electrophoresis 25.10-11 (2004): 1695-1704.

Luo, J., et al. "Insulator-based dielectrophoresis of mitochondria." Biomicrofluidics 8.2 (2014): 021801.

Martinez-Duarte, R., et al. "Dielectrophoresis of lambda-DNA using 3D carbon electrodes." Electrophoresis 34.7 (2013): 1113-1122.

Morgan, H., et al. "Separation of submicron bioparticles by dielectrophoresis." Biophysical journal 77.1 (1999): 516-525.

Morton, K. J., et al. "Hydrodynamic metamaterials: Microfabricated arrays to steer, refract, and focus streams of biomaterials." Proceedings of the National Academy of Sciences 105.21 (2008): 7434-7438.

Nakano, A. et al. "Insulator-based dielectrophoresis with ß-galactosidase in nanostructured devices." Analyst 140.3 (2015): 860-868.

Ozuna-Chacón, S., et al. "Performance characterization of an insulator-based dielectrophoretic microdevice." Electrophoresis 29.15 (2008): 3115-3122.

Pesch, G. R., et al. "Electrodeless dielectrophoresis: Impact of geometry and material on obstacle polarization." Electrophoresis 37.2 (2016): 291-301.

Pethig, R.. "Dielectrophoresis: Status of the theory, technology, and applications." Biomicrofluidics 4.2 (2010): 022811.

Pohl, H. A. "The motion and precipitation of suspensoids in divergent electric fields." Journal of Applied Physics 22.7 (1951): 869-871.

Pohl, H. A., et al. "Dielectrophoresis of cells." Biophysical journal 11.9 (1971): 711-727.

Probstein, R. F., Physicochemical Hydrodynamics: An Introduction, John Wiley & Sons, Inc. 1994, pp. 1-8.

Pysher, M. D., et al. "Electrophoretic and dielectrophoretic field gradient technique for separating bioparticles." Analytical chemistry 79.12 (2007): 4552-4557.

Regtmeier, J., et al. "Dielectrophoretic manipulation of DNA: separation and polarizability." Analytical chemistry 79.10 (2007): 3925-3932.

Ros, A., et al. "Bioanalysis in structured microfluidic systems." Electrophoresis 27.13 (2006): 2651-2658.

Sabounchi, P., et al. "Sample concentration and impedance detection on a microfluidic polymer chip." Biomedical Microdevices 10.5 (2008): 661.

Saucedo-Espinosa, M. A., et al. "Design of insulator-based dielectrophoretic devices: Effect of insulator posts characteristics." Journal of Chromatography A 1422 (2015): 325-333.

Saucedo-Espinosa, M. A., et al. "Experimental and theoretical study of dielectrophoretic particle trapping in arrays of insulating structures: Effect of particle size and shape." Electrophoresis 36.9-10 (2015): 1086-1097.

Shalliker, R. A., et al. "Physical evidence of two wall effects in liquid chromatography." Journal of Chromatography A 888.1-2 (2000): 1-12.

Srivastava, S. K., et al. "A continuous DC-insulator dielectrophoretic sorter of microparticles." Journal of Chromatography A 1218.13 (2011): 1780-1789.

Srivastava, S. K., et al. "DC insulator dielectrophoretic applications in microdevice technology: a review." Analytical and bioanalytical chemistry 399.1 (2011): 301-321.

Srivastava, S. K., et al. "Direct current insulator-based dielectrophoretic characterization of erythrocytes: ABO-Rh human blood typing." Electrophoresis 32.18 (2011): 2530-2540.

Staton, SJR, et al. "Characterization of particle capture in a sawtooth patterned insulating electrokinetic microfluidic device." Electrophoresis 31.22 (2010): 3634-3641.

Staton, SJR, et al. "Manipulation and capture of Aß amyloid fibrils and monomers by DC insulator gradient dielectrophoresis (DC-iGDEP)." Analyst 137.14 (2012): 3227-3229.

Streek, M., et al. "Mechanisms of DNA separation in entropic trap arrays: a Brownian dynamics simulation." Journal of biotechnology 112.1-2 (2004): 79-89.

Su, Y.-H., et al. "Quantitative dielectrophoretic tracking for characterization and separation of persistent subpopulations of Cryptosporidium parvum." Analyst 139.1 (2014): 66-73.

Swami, N., et al. "Enhancing DNA hybridization kinetics through constriction-based dielectrophoresis." Lab on a Chip9.22 (2009): 3212-3220.

Thwar, P. K., et al. "Electrodeless direct current dielectrophoresis using reconfigurable field-shaping oil barriers." Electrophoresis28. 24 (2007): 4572-4581.

Washizu, M. et al. "Electrostatic manipulation of DNA in microfabricated structures." IEEE Transactions on industry applications 26.6 (1990): 1165-1172.

Weiss, N. et al., "Dielectrophoretic mobility determination in DC insulator-based dielectrophoresis", Electrophoresis, Sep. 2011 [available online Aug. 2011]. vol. 32, No. 17, pp. 2292-2297 (DOI:10. 1002/elps.201100034).

Zellner, P. et al., "3D Insulator-based dielectrophoresis using DC-biased, AC electric fields for selective bacterial trapping", Electrophoresis, Jan. 2015 [available online Sep. 2014], vol. 36, No. 2, pp. 277-283 (DOI:10.1002/elps.201400236).

* cited by examiner

| Insulator Base Design | Full Channel | Enlarged Last Gate |
|---|---|---|
| Triangle | | |
| *Inverse 20×Curve* | | |
| Ellipse | | |
| Multi-Length Scale | | |

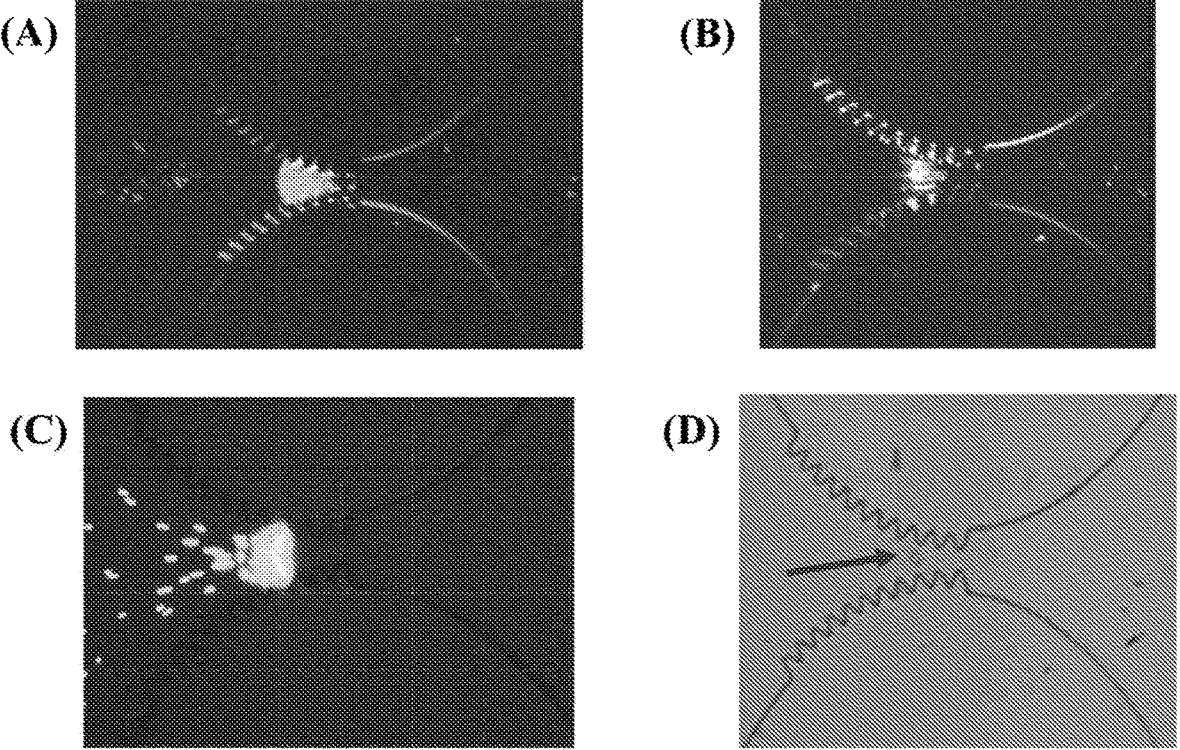
FIG. 10A-D

HYPER EFFICIENT SEPARATIONS DEVICE

CROSS-REFERENCES TO RELATED APPLICATIONS

This is a continuation of U.S. application Ser. No. 17/400,419, filed Aug. 12, 2021, which application is a divisional of U.S. patent application Ser. No. 16/324,324 filed Feb. 8, 2019, now U.S. Pat. No. 11,090,660, granted on Aug. 17, 2021, which is a 371 application of PCT/US2017/046217 filed Aug. 10, 2017, which claims priority to U.S. Provisional Application No. 62/372,846 filed on Aug. 10, 2016, the contents of which are incorporated by reference in their entirety.

STATEMENT REGARDING FEDERALLY SPONSORED RESEARCH

This invention was made with government support under grants R03 AI094193, R03 AI099740, and R03 AI111361 awarded by the National Institutes of Health. The government has certain rights in the invention.

BACKGROUND OF THE INVENTION

1. Field of the Invention

This invention relates to insulator-based dielectrophoresis for the separating analytes.

2. Description of the Related Art

In the last several years the exploitation of microfluidics as a method for analyte manipulation has grown rapidly; particularly for biological samples. This is driven by the current limitations of diagnostic methods, especially the need for large sample volumes, lengthy analysis times, and low resolution/sensitivity. Microfluidic devices have the potential to improve each of these figures of merit and provide for easy portability and the use on a wide range of analytes including bioparticles. Among the latter class: animal cells[1], organelles[2], proteins[3, 4], DNA[5-7] and bacteria[8-11] have been probed.

One major division of microfluidics uses electrokinetic (EK) and the dielectrophoretic (DEP) forces on particles (molecules are considered particles for the purposes of this discussion). The EK forces allows for the manipulation of both the particle and the suspending medium, as it is the sum of electrophoresis and electroosmosis. DEP is the force that is exerted on a polarizable particle present in a non-uniform electric field ($\vec{E}$). Utilizing EK and DEP forces, trapping and streaming of particles is possible. This allows for the separation of analytes bases on their specific and subtle electrical physical properties.[10, 12-14]

Previous work on DEP separations has utilized electrode-based dielectrophoresis (eDEP) for separations, which has the advantage of being able to induce high field gradients with a low applied voltage.[15-22] Fabrication of eDEP devices is difficult and expensive, which is made worse as electrodes are easily fouled, rendering the channels non-reusable. The electrodes cause further issues as electrolysis-created bubbles and the high gradients are only local to the electrodes.

Insulator-based dielectrophoresis (iDEP) is an alternative to induce non-uniform electric fields in a microchannel. In contrast to eDEP, the electrodes are placed in distal inlet and outlet reservoirs and the electric field is defined by channel insulators and the conductive media.

This resolves many of the issues encountered with eDEP (electrolysis, bubbles, fouling). Both AC and DC fields can be used with iDEP; DC fields drive overall particle movement since it induces EK and DEP transport and AC can refine separations influencing DEP only.[2, 6, 23-27] iDEP was theoretically conceived and proof of concept established in the early 2000s.[6, 28] Since then many different types of insulators have been utilized to achieve points of constriction[29] including single obstacles of various shapes[30, 31], oil menisci[32, 33], and insulating posts[28, 34-36]. The first separation to be demonstrated using iDEP was that of live and dead bacteria.[9, 10]

For all iDEP designs, the constriction geometry defines the overall performance, whether the basic shape is repeated or varies some characteristic dimension. The assessment here focuses on the constriction design, which is universal to all iDEP systems.[29] Examples of insulator shapes currently utilized include rectangle[14, 31, 37], triangle[25-27, 31] saw-tooth[11, 23, 38, 39], circular posts[2, 10, 11, 27, 28, 35, 40], and diamond posts.[28, 41, 42] Trapping DEP leads to the isolation and concentration of analytes near the constriction points in the microchannels.[1-3, 6, 8, 10, 11, 25, 26, 28, 35] Separation can be achieved as a bipurification, where one analyte is trapped and other analytes continue to flow through the microchannel[10], or multiple analytes can be trapped in the same microchannel.[11] Deflection techniques can also be used to achieve separations.[13, 43] Separation is possible in this case as the different mobilities of analytes results in different degrees of deflection when the particle passes the point of constriction in the microdevice.[44] Inducing the same behavior for a given particle type across all starting points will improve all existing iDEP systems.

Each of these configurations creates different local environments for the analytes relative to the local longitudinal axis dependent upon the initial lateral position in the channel (FIG. 1).[1, 45, 46] This is true for local traps or elution strategies. For the purpose of high resolution separations, several factors come into play; including high values for the electric field and gradient[12] and the induction of all particles of an identical population to traverse the longitudinal axis in a similar fashion where the electric field strength and gradient intensity achieve separatory differentials (whether trapping, streaming (multi-outlet), or stochastic-based and chromatography-like elution-based strategies).[10, 11, 38, 39, 47-51] The identical or at least similar (accounting for diffusion and dispersion) movement of all particles of an identical population is a core tenet of separations science. The manipulation of analytes by DEP is possible because each analyte has unique properties reflected by their electrophoretic ($\mu_{EP}$) and dielectrophoretic ($\mu_{DEP}$) mobilities. For all microchannels changing the constriction size, shape of the insulator, suspending medium, or the applied potential will alter the particles interaction with the microchannel.[3, 39, 52] Preliminary work has been done to improve and optimize the current iDEP designs utilized for trapping DEP.[41, 64, 65]

Thus, there is a need for a design of insulators that provides improved particle streamlines, trapping efficiency and induces laterally similar environments.

SUMMARY OF THE INVENTION

The invention provides a hyper-resolution insulator-based dielectrophoresis device for separating at least one analyte from a fluid. The invention also provides a way to separate multiple analytes from each other in one device. The device comprises a fluid flow channel disposed on a substrate. The fluid flow channel is defined by a first wall, a second wall spaced from the first wall, a fluid inlet, and a fluid outlet. The first wall includes an insulating flow structure extending toward the second wall thereby defining a constriction in the fluid flow channel between the first wall and the second wall. The insulating flow structure comprises a base section and a plurality of projections extending from the base section toward the second wall. The device includes electrodes in electrical communication with the fluid inlet and the fluid outlet of the fluid flow channel. The electrodes are positioned to generate a spatially non-uniform electric field across the insulating flow structure of the fluid flow channel to exert a dielectrophoretic force on particles suspended in the fluid within the fluid flow chamber. The device includes a power supply connected to each of the electrodes to generate an electric field within the fluid flow channel.

In some aspects, the invention provides a multi-length scale structure for use in an insulator-based dielectrophoresis device for separating an analyte from a fluid, the device including a fluid flow channel disposed on a substrate, and the fluid flow channel being defined by a first wall, and a second wall spaced from the first wall. The multi-length scale structure comprises an insulating flow structure extending from the first wall toward the second wall thereby defining a constriction in the fluid flow channel between the first wall and the second wall. The insulating flow structure comprises a base section and a plurality of projections extending from the base section toward the second wall. In some embodiments, the base section is elliptically shaped and the projections are elliptically shaped. In some embodiments, each projection has a first end at a first junction with the base section and a second end at a second junction with the base section, and a length from the first end to the second end is in the range of 10 to 40 μm.

In some aspects of the multi-length scale structure, the base section extends from an upstream junction with the first wall to a downstream junction with the first wall, and the projections only extend from the base section over a portion of a distance from the upstream junction to the downstream junction. In some embodiments of the multi-length scale structure, the projections only extend from the base section over one half or less of the distance from the upstream junction to the downstream junction.

In some aspects, the invention provides a method of separating a first analyte from a second analyte, the method comprising:

(a) providing the device described herein;

(b) transporting a fluid including the first analyte and the second analyte from the fluid inlet through the constriction in the fluid flow channel toward the fluid outlet.

These and other features, aspects, and advantages of the present invention will become better understood upon consideration of the following detailed description, drawings and appended claims.

BRIEF DESCRIPTION OF THE DRAWINGS

FIG. 2A-B are triangle/diamond, FIG. 2C-D are Inverse 20× Curve, 2E-F are circle and 2G-H are ellipse.

Electric field lines present in all panels. At low $$\frac{\nabla |\vec{E}|^2}{E^2} \cdot \vec{E}$$

values, electric field lines are the pathlines of particles. Panels showing triangular insulator (A & B) show electric field lines off the centerline impinging the slope of the $$\frac{\nabla |\vec{E}|^2}{E^2} \cdot \vec{E}$$

(local direction of dielectrophoretic forces) at highly acute angles, creating a local trapping point. These lateral trapping areas are present at all sharp features and some rounded features (B & D). In this study, for the triangular and ellipse insulator given the analyte $\mu_{EK}/\mu_{DEP}$ ratio of choice, the analyte is partially trapped at the first gate and fully trapped at the second gate. In contrast, the critical particle would pass the first gate completely and be trapped at the second gate for the multi-length scale insulator. Further, the multi-length scale insulator does not exhibit any lateral traps were the electric field lines impinge the $$\frac{\nabla |\vec{E}|^2}{E^2} \cdot \vec{E}$$

slope at extremely acute angles. The gate pitches are 36.37 µm and 34.10 µm, left to right (A-F).

Figure 8:
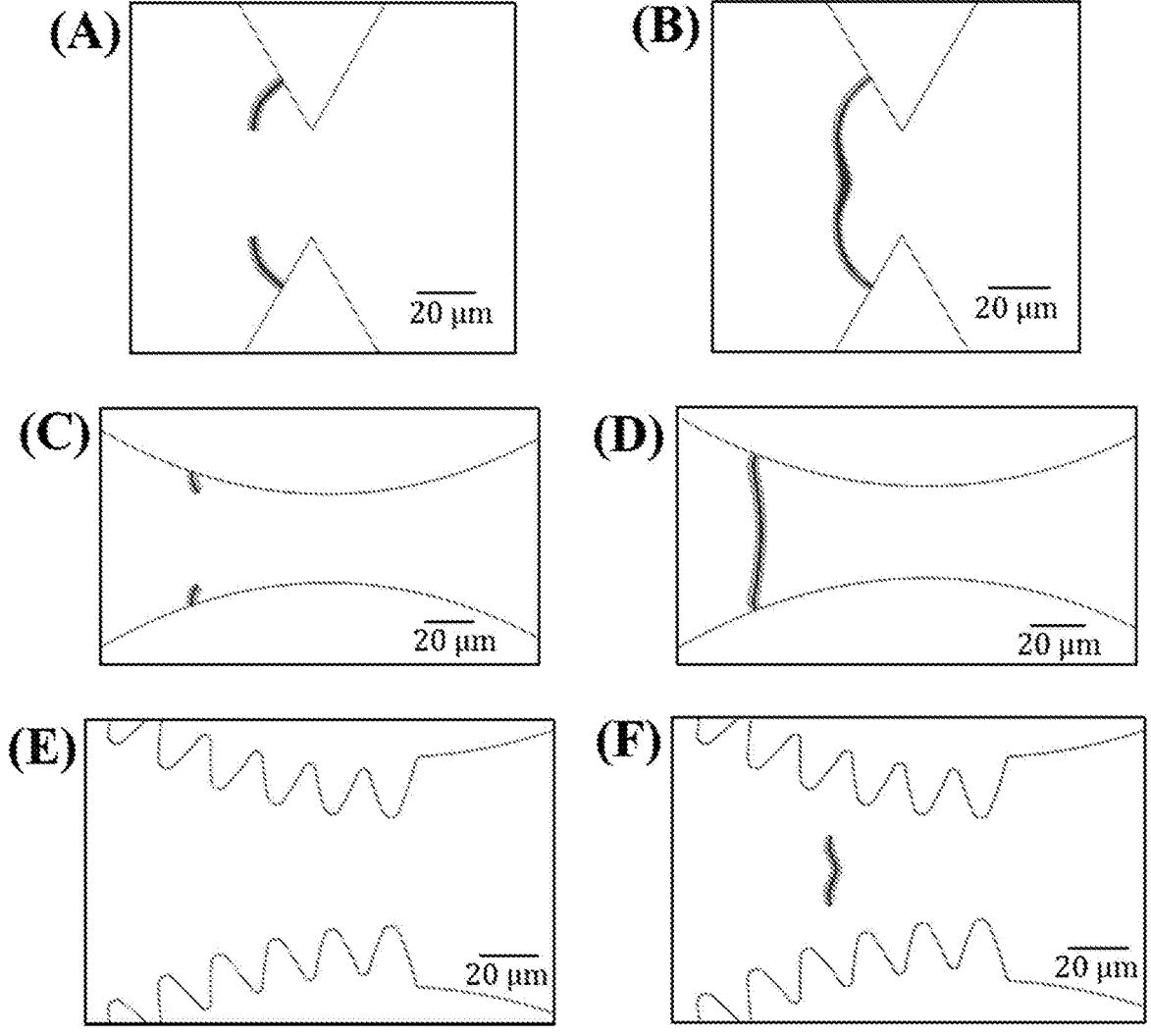

FIG. 8A-F show images emphasizing differences between triangular and multi-length scale insulators at the critical transition to full trapping at second gate (non-trapping at left, trapping at right). Similar data is shown in all six panels, with different representations to emphasize various transport and trapping features. Predicted trapping locations for the different designs were determined, based on different mobilities ratio. For both the triangular and elliptically shaped insulators partial trapping is seen at the 36.37 µm gate (FIGS. 8A & 8C), while no trapping is seen for multi-length insulator (FIG. 8F). Complete trapping of an analyte is seen for all insulator shapes at the 34.10 µm gate (FIGS. 8B, 8D, & 8F).

Figure 9:
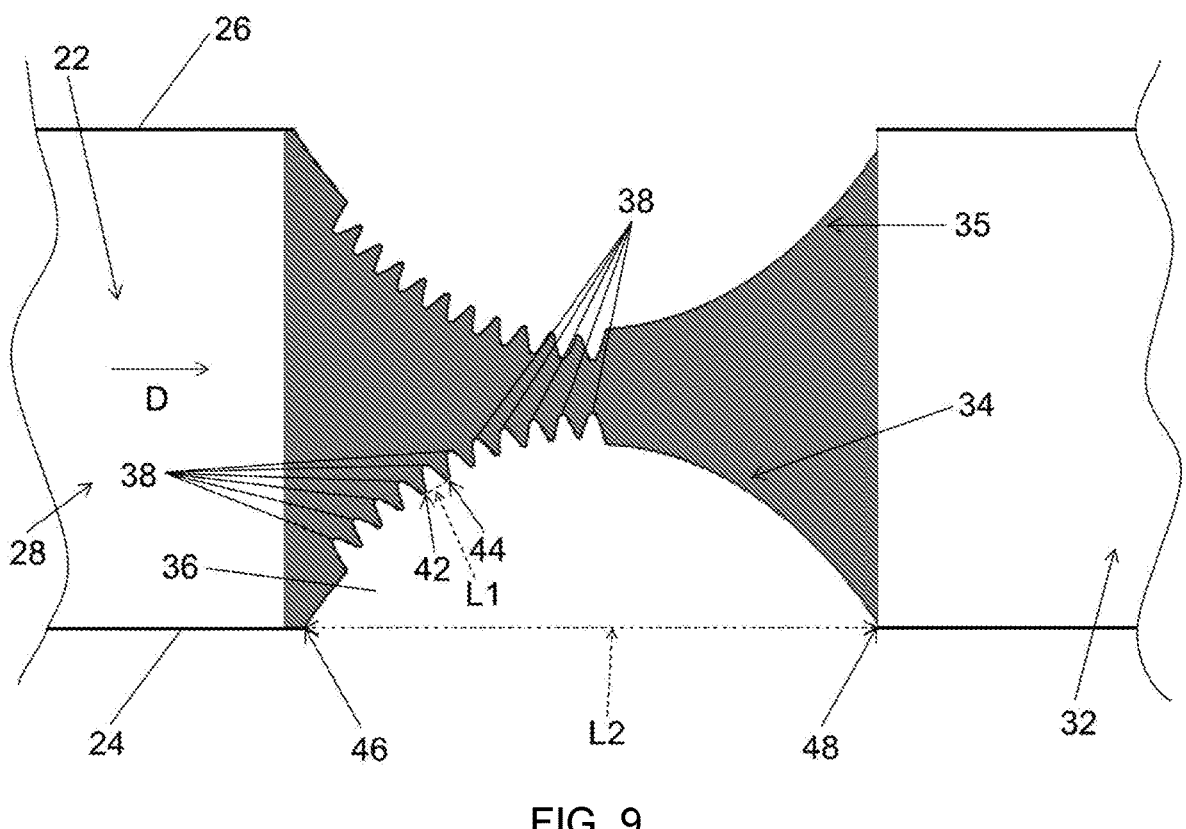

FIG. 9 is an enlarged partial view of one example insulator-based dielectrophoresis device of the present invention showing the insulating structure.

FIG. 10A-D are examples of trapping with various analytes using the multi-length scale insulators. Light field/dark field contrast enhanced image of (A) 1.8 µm silica particles (large number of particles collected) and (B) 2.7 µm silica particles. Fluorescence/bright field contrast enhanced micro-image of (C) 2.0 µm yellow-green fluorescent polystyrene spheres. Transmission light field image of (D) 7-10 µm stem cell. Gate sizes and applied potentials are as follows (A) 12.3 µm, −1000 V (B) 18.0 µm, −1000 V (C) 18.7 µm, −400 V (D) 18.0 µm, −150 V.

DETAILED DESCRIPTION OF THE INVENTION

There is a need for high resolution and low costs methods of separating analytes with similar properties. One way to achieve separations of analytes is using trapping and streaming dielectrophoresis (DEP) which directly exploits the subtle differences in electrophysical properties of analytes. The non-uniform fields necessary for DEP can be formed using various insulator shapes in microchannels. Current insulator shapes include triangles, diamonds, circles, and rectangles. However, all of these insulators pose problems for trapping, streaming, and sorting (deflection) as they are not behaviorally consistent across the lateral dimension. This leads to analytes experiencing different forces depending on their pathline in the microchannel and result in low resolution separations.

The present invention has developed a design that improves particle streamlines, trapping efficiency, and induces laterally similar environments. The design was assessed by calculating and plotting the electric field, gradient of the electric field squared, and the ratio of the two. The improved design includes a unique new multi-length scale element. The multi-length scale structure streamlines the analyte(s) and improves homogeneity in the lateral dimension, while still achieving high gradients necessary for analyte separation using DEP. The design improves resolution and essentially eliminates extraneous trapping zones.

In some embodiments, the present invention provides a method of isolating or separating at least one analyte in a sample comprising using a device as described herein using insulator-based dielectrophoresis (iDEP). In some embodiments, the device may be a microfluidic device.

Dielectrophoresis (hereinafter "DEP"), is an electrodynamic transport mechanism with a nonlinear dependence on electric field. A non-uniform electric field produces an unequal electrodynamic force on the charge of a particle producing a net movement of the particle toward the region of higher electric field gradient. The resulting motion is called dielectrophoresis and can occur in either direct (hereinafter "DC"), alternating (hereinafter "AC") electric fields, or a combination of both AC and DC. Insulator-based dielectrophoresis (iDEP) is an alternative to conventional electrode-based dielectrophoresis (eDEP) systems. In iDEP, insulating structures are used to generate nonuniform electric fields. iDEP method differs from traditional DEP separation in that a voltage, created by either DC, AC, or a combination of DC and AC, is applied to electrodes located in remote inlet and outlet reservoirs and the field nonuniformities are generated by arrays of insulating posts located within the channel.

iDEP offers several advantages compared with traditional DEP. The use of remote electrodes avoids many of the problems associated with embedded electrodes, such as electrochemical reactions and bubble generation at the electrode surfaces. Additionally, the use of DC voltages in eDEP creates many issues, which are not encountered in iDEP. The use of a DC field can be advantageous because it can be used to drive both electrophoretic and dielectrophoretic transports, allowing greater control over particle movement. The present invention provides improvements on iDEP devices by providing higher resolution separations of analytes by altering the structure of the insulating features.

In some embodiments, the present invention provides a hyper-resolution insulator-based dielectrophoresis ("iDEP") device for separating at least one analyte from a fluid. The device comprises one or more fluid flow channels disposed on a substrate, wherein each said fluid flow channels comprises at least one fluid inlet and at least one fluid outlet and a plurality of insulating flow structures disposed on the substrate, wherein the insulating flow structure comprises a multi-length scale structure; electrodes in electrical communication with the at least one fluid inlet and at least one outlet of each of the plurality of fluid flow channels, wherein the electrodes are positioned to generate a spatially non-uniform electric field across the plurality of insulating flow structures of each fluid flow channel to exert a dielectrophoretic force on particles suspended in a fluid within the fluid flow chamber(s), and power supply means connected to each of the electrodes to generate an electric field within said fluid flow channel; wherein the device separates the at least one analyte from the fluid.

As used herein, "channel" refers to a structure wherein a fluid may flow. A channel may be a capillary, a conduit, a chamber, a strip of hydrophilic pattern on an otherwise hydrophobic surface wherein aqueous fluids are confined, and the like. In some instances, the channel may be a microchannel. In some embodiments, the device or system is a microfluidic device having one or more fluidic channels that are generally fabricated at the millimeter to nanometer scale.

In some embodiments, the fluid channels are "microfluidic channels" or alternatively referred to herein as "microchannels." Microchannels generally have cross-sectional dimensions ranging from about 10 nm to about 2 mm, depending on the analyte. Most microchannels fall between 100 nm and 1 mm. The dimensions of the microchannels are dependent on the desired effect on the analyte. In some embodiments, the cross-sectional dimensions are greater than 10 nm but less than 2 mm. As provided herein, the microfluidic channels are formed in a substrate made of insulating material(s), such as polymers, glass, and the like.

In some embodiments, the microchannels having the insulating structures of the present invention are known in the art. The microchannels may be of any desired shape and length. In some embodiments, the microchannels are about 10 µm to 5 mm wide, about 1 mm to 5 cm or more long and about twice the size of the analyte of interest to 1 cm in depth. When determining the depth depending on the analyte at some point the physics of DEP will no longer affect the analyte of interest. The insulating structures can be scaled to the size of the microchannel to achieve the desired affect.

As used herein, a "fluid" refers to a substance that tends to flow and to conform to the outline of a container such as a liquid or a gas. Fluids include saliva, mucus, blood, plasma, urine, bile, breast milk, semen, tears, water, liquid beverages, cooking oils, cleaning solvents, hydrocarbon oils, fluorocarbon oils, ionic fluids, buffers, air, crystal solutions, chemical reactions, cell cultures, body fluid, buffers, and the like. Fluids can also exist in a thermodynamic state near the critical point, as in supercritical fluids. If one desires to test a solid sample for a given analyte according to the present invention, the solid sample may be made into a fluid sample using methods known in the art. For example, a solid sample may be dissolved in an aqueous solution, ground up or liquefied, dispersed in a liquid medium, melted, digested, and the like. Alternatively, the surface of the solid sample may be tested by washing the surface with a solution such as water or a buffer and then testing the solution for the presence of the given analyte.

As used herein, "analyte" is used interchangeably with "particle" to refer to a particle that may be natural or synthetic chemicals and biological entities (biomolecules).

Suitable natural or synthetic chemicals or biological entities can include, but are not limited to, for example, microorganisms, amino acids, peptides, proteins, glycoproteins, nucleotides, nucleic acid molecules, carbohydrates, lipids, lectins, cells, viruses, viral particles, bacteria, organelles, spores, protozoa, yeasts, molds, fungi, pollens, diatoms, toxins, biotoxins, hormones, steroids, immunoglobulins, antibodies, supermolecular assemblies, ligands, catalytic particles, zeolites, and the like, biological and chemical agents, drugs, prodrugs and metabolites, and the like, magnetic particles, high-magnetic-permeability particles, deuterated compounds, metal ions, metal ion complexes, inorganic ions, inorganic ion complexes, isotopes, organometallic compounds, metals including aluminum, arsenic, cadmium, chromium, selenium, cobalt, copper, lead, silver, nickel, and mercury, and the like, industrial polymers, powders, latexes, emulsions, colloids, environmental pollutants, pesticides, insecticides.

In some embodiments, the analyte may be a cell, for example, a human cell, for example a blood cell or a stem cell or progenitor stem cells. In some embodiments, the present device may be used to separate out differentiating stem cells from a culture.

In some embodiments, the methods and devices of the present invention may be used to isolate and concentrate stem cells based on their progenitor stage (i.e. at different stages of differentiation).

In other embodiments, the analyte may be a bacteria. In some embodiments, the separation of different bacterial strains or serotypes is contemplated. For example, in one example, the ability to isolate resistant versus susceptible bacteria to a specific antibiotic is contemplated.

In other embodiments, the analyte may be a crystal structure, for example a crystal structure in a composition derived from crystal growing and used in crystallography.

In some embodiments, the device is used to separate at least one analyte from a fluid. As used herein, "separating" refers to removing a given analyte from its initial environment which may include removing analytes of one or more species of interest from analytes of different or other species. Separating an analyte in a fluid results in concentration of the analyte and dilution of the analyte in the fluid. In some embodiments, one type of analyte may be separated from another type (a second analyte). In some embodiments, more than two analytes can be separated. In some embodiments, the method involves separating the analytes from contaminants or other debris within the fluid. In some embodiments, methods of using the device to separate one or more cell types from another is contemplated. In some embodiments, methods of isolating progenitor stem cells for each other is contemplated.

In some embodiments, the device may be used to concentrate at least one analyte. As used herein, "concentrating" refers to the reduction of fluid volume per particle/analyte in the fluid. The methods and devices of the present invention allow a fluid to be concentrated or diluted. When the methods and devices are used to concentrate a fluid, it is noted that particles in one portion of the fluid becomes "concentrated" and that particles in the second portion of the fluid becomes "diluted".

In some embodiments, the device comprises an insulating flow structure comprises a multi-length scale structure. This multi-length scale structure provides improved resolution and separation of analytes. In some embodiments, the multi-length scale structure comprises an elliptically-shaped base insulator and small elliptically shaped insulators (projections) across part of the elliptically-shaped base. The size of the multi-length scale insulators is dependent on the size of the microchannel. In some embodiments, the small elliptically shaped insulators are 50 nm to 50 μm tall and/or wide at the base and as small as 5 nm wide at the top.

In some embodiments, the small elliptically shaped insulators cover part of the base. In some embodiments, "part" of the base is at least 1-100% of the base, more preferably a little less than half (35-45%) of the surface of the base. The shape is not limited to ellipses and can include, but is not limited to: circles, triangles, rectangles, and so forth. Additionally, any combination of these can also be used.

A suitable structure for the multi-length scale structure is depicted in FIG. 6E. Other examples of suitable structures are presented in FIG. 5.

In some embodiments, the multi-length scale structure comprises a base structure in a shape selected from the group consisting of circles, ellipses, rectangles, squares, triangles, and curves, including an inverse 20× curve. In some embodiments, the base structure is covered with insulators (projections) that are of a shape selected from the group consisting of circles, ellipses, rectangles, squares, triangles, and curves, including an inverse 20× curve.

In some embodiments, the multi-length scale structure provides improved particle streamlines, improved separation and improved resolution of analytes. In some embodiments, the structures reduce and/or eliminate extraneous trapping zones. As used herein, "trapping zone" describes the point in the microchannel where an analytes of interest are stationary as a balance point between electrokinetic force and dielectrophoretic force. The "trapping zone" can also be described when a particle's velocity along the field line is zero. This leads to trapping occurring when the ratio of the electrokinetic and dielectrophoretic mobilities is greater than or equal to the ratio of the gradient of the electric field squared to the electric field, $$\frac{\nabla |\vec{E}|^2}{E^2} \cdot \vec{E} \ge \frac{\mu_{EK}}{\mu_{DEP}}.$$

In some embodiments, the device using the multi-length scale structure provides a high $\nabla |\vec{E}|^2$ as to provide enhanced resolution of analytes. Current ranges of $\nabla |\vec{E}|^2$ are between $10^{12}$ and $10^{23}$ V²/m³. The $\nabla |\vec{E}|^2$ necessary to influence particles behavior depends on the size of the analytes of interest. Lower $\nabla |\vec{E}|^2$ are able to influence the larger particles (~1-50 μm), while higher $\nabla |\vec{E}|^2$ are required to influence smaller particles (~10-1000 nm).

In some embodiments, the devices can be used for scientific research or diagnostic purposes. The devices may be used for separation of bioparticles, including proteins or cells. For example, the devices of the present invention may be used to determine a type of bacterial infection by separating different serotypes of drug-resistant and susceptible bacteria from a sample. This would allow for rapid diagnosis of bacterial infections to insure the correct antibiotic is administered. The present device is small and portable and would reduce the time for diagnosis as opposed to the standard technique of culturing the bacteria.

The device of the present invention is small and portable. It does not require any specific immuno- or geno-recognition or cold-chain products to separate out analytes. In some embodiments, the device can be used in a one-step diagnostic device for use in a number of clinical fields.

In some embodiments, the methods and devices of the invention can be used to separate out cells based on their biophysical characteristics.

In other embodiments, the devices and methods can be used for crystallography to efficiently separate out various sizes of crystals. For various crystallography methods, narrow crystal size ranges are needed.

Looking at FIG. 9, there is shown a hyper-resolution insulator-based dielectrophoresis device for separating an analyte from a fluid. The device comprises a fluid flow channel 22 disposed on a substrate. The fluid flow channel 22 is defined by a first wall 24, a second wall 26 spaced from the first wall 24, a fluid inlet 28, and a fluid outlet 32. The fluid flow D is from the fluid inlet 28 to the fluid outlet 32. The first wall 24 includes an insulating flow structure 34 extending toward the second wall 26 thereby defining a constriction in the fluid flow channel 22 between the first wall 24 and the second wall 26. The insulating flow structure 34 comprises a base section 36 and a plurality of projections 38 extending from the base section 36 toward the second wall 26. The device includes electrodes in electrical communication with the fluid inlet 28 and the fluid outlet 32 of the fluid flow channel 22, wherein the electrodes are positioned to generate a spatially non-uniform electric field across the insulating flow structure of the fluid flow channel to exert a dielectrophoretic force on particles suspended in the fluid within the fluid flow chamber. The device includes a power supply connected to each of the electrodes to generate an electric field within the fluid flow channel 22. In the embodiment of FIG. 9, the second wall 26 includes a second insulating flow structure 35 having the same structure as the insulating flow structure 34. However, the second insulating flow structure may have a different configuration from the insulating flow structure 34.

In the non-limiting example embodiment of FIG. 9, each projection 38 has a first end at a first junction 42 with the base section 36 and a second end at a second junction 44 with the base section 36. A length L1 from the first end to the second end can be in the range of 50 nm to 100 μm.

In the embodiment of FIG. 9, the base section 36 extends from an upstream junction 46 with the first wall to a downstream junction 48 with the first wall, and the projections 38 only extend from the base section over a portion of a distance L2 from the upstream junction 46 to the downstream junction 48. The projections may only extend from the base section 36 over one half or more/less of the distance L2 from the upstream junction 46 to the downstream junction 48. As used herein, a location or portion is upstream if it is situated in relation to a reference point in the opposite direction from that in which the fluid flows, whereas a location or portion is downstream if it is situated in relation to the reference point in the direction in which the fluid flows.

In some embodiments, the base section is elliptically shaped and the projections are elliptically shaped.

In some embodiments, the fluid flow channel is a microchannel. In some embodiments, the analyte is a cell, in some instances a human cell, and in other instances a bacterial cell. In some embodiments, the analyte is a microorganism. In some embodiments, the analyte is a protein. In some embodiments, the analyte is a crystal. In some embodiments, the analyte is a virus.

In some embodiments, the device provides improved particle streamlines.

In further embodiments, the device provides enhanced analyte separation and improved resolution.

In some embodiments, the device reduces or eliminates extraneous trapping zones.

In some embodiments, the device provides a high $\nabla |\vec{E}|^2$ as to provide enhanced resolution of analytes.

In some embodiments, the invention provides a multi-length scale structure for use in an insulator-based dielectrophoresis device for separating an analyte from a fluid, the device including a fluid flow channel disposed on a substrate, the fluid flow channel being defined by a first wall, and a second wall spaced from the first wall. The multi-length scale structure comprises an insulating flow structure extending from the first wall toward the second wall thereby defining a constriction in the fluid flow channel between the first wall and the second wall, the insulating flow structure comprising a base section and a plurality of projections extending from the base section toward the second wall. In some embodiments, the base section is elliptically shaped and the projections are elliptically shaped. In some embodiments, each projection has a first end at a first junction with the base section and a second end at a second junction with the base section, a length from the first end to the second end being in the range of 50 nm to 100 μm.

In some embodiments of the multi-length scale structure, the base section extends from an upstream junction with the first wall to a downstream junction with the first wall, and the projections only extend from the base section over a portion of a distance from the upstream junction to the downstream junction. In some embodiments of the multi-length scale structure, the projections only extend from the base section over one half or less of the distance from the upstream junction to the downstream junction. In some embodiments of the multi-length scale structure, the projections extend from the base section over more than half of the distance from the upstream junction to the downstream junction. The second wall of the multi-length scale structure may include a second insulating flow structure having the same structure as the insulating flow structure on the first wall. However, the second insulating flow structure may have a different configuration from the insulating flow structure on the first wall.

In some embodiments, the invention provides a method of separating a first analyte from a second analyte. The method comprises (a) providing the device described herein; and (b) transporting a fluid including the first analyte and the second analyte from the fluid inlet through the constriction in the fluid flow channel toward the fluid outlet.

The methods and devices described herein can be used to separate at least one analyte, and in many embodiments, can separate one or more analytes, including any number of analytes. For example, in some embodiments, the methods and devices can separate two or more analytes, three or more analytes, four or more analytes, five or more analytes, six or more analytes, seven or more analytes, eight or more analytes, nine or more analytes, ten or more analytes, etc. Suitably, any number of analytes can be separated, e.g., 2, 3, 4, 5, 6, 7, 8, 9, 10, 15, 20, 25, 30, 35, 40, 45, 50 etc. In some embodiments, any number of analytes can be separated, especially in systems used in tandem or loop with a variable voltage.

It must be noted that as used herein and in the appended claims, the singular forms "a", "an", and "the" include plural references unless the context clearly dictates otherwise. As well, the terms "a" (or "an"), "one or more" and "at least one" can be used interchangeably herein. It is also to be noted that the terms "comprising", "including", and "having" can be used interchangeably.

The invention will be more fully understood upon consideration of the following non-limiting examples. Each publication, patent, and patent publication cited in this disclosure is incorporated in reference herein in its entirety.

EXAMPLES

The following examples are provided in order to demonstrate and further illustrate certain embodiments and aspects of the present invention and are not to be construed as limiting the scope of the invention.

Example 1

This example describes the development of a novel insulator geometry to improve the separation capabilities of iDEP. By iteratively modeling current and potential new designs using finite element software, a new multi-length scale insulator has been developed. The insulator design will streamline the particles, minimize the possibility for extraneous trapping zones, laterally homogenize the forces, while maintaining high gradients to allow for separation.

Manipulation of the analytes is possible because of the influence of the EK and the DEP forces. Further development can be found in several previous works.[9, 10, 28, 53, 54] The electrokinetic velocity, $\vec{v}_{EK}$, is the combination of electrophoretic and electroosmotic velocities $$\vec{v}_{EK} = \mu_{EK}\vec{E} = (\mu_{EOF} + \mu_{EP})\vec{E} \tag{1}$$

The DEP velocity, $\vec{v}_{DEP}$, can be represented in terms of dielectrophoretic mobility ($\mu_{DEP}$) and the gradient of the electric field squared, $\nabla|\vec{E}|^2$.[53, 55, 56]

$$\vec{v}_{DEP} = \mu_{DEP}\nabla|\vec{E}|^2 \tag{2}$$

DEP is the force that is exerted on a polarizable spherical particle present in a non-uniform electric field.[53, 56]

$$\vec{F}_{DEP} = 2\pi\varepsilon_m r^3 f_{CM}\nabla|\vec{E}|^2 \tag{3}$$

where $\vec{F}_{DEP}$ is the DEP force, $\varepsilon_m$ is the permittivity of the medium, r is the radius of the particle, and $f_{CM}$ is the Clausius-Mossotti factor which is dependent on the conductivity of the particle and medium in DC fields. Depending upon the sign of $f_{CM}$, the particle of interest will either undergo positive or negative DEP. In positive DEP, the conductivity of the particle is greater than the conductivity of the media; meaning that the particle is attracted to areas of high electric field. In negative DEP, the conductivity of the media is larger than that of the particle so the particle is effectively repelled from the locations of high electric field strength.

The flow of analytes in a microfluidic channel is controlled by advection, diffusion and electrokinetic effects.[41] By eliminating pressure driven flow in the system advection can be ignored. For large particles (>1 μm) diffusion can be disregarded. Therefore particle flow, $\vec{J}$ can be described by the following:[42, 57]

$$\vec{J} = D\nabla C + C(\vec{v}_{Bulk} + \vec{v}_{EK} + \vec{v}_{DEP}) \approx C(\vec{v}_{EK} + \vec{v}_{DEP}) \tag{4}$$

where D is the diffusion coefficient, C is the particle concentration, and $\vec{v}_{Bulk}$ is the motion of the fluid due to pressure driven flow. Therefore, particle flow is consequently only affected by the concentration of the analyte, EK, and DEP.

Dielectrophoretic forces are influenced by constrictions in the microchannel, as this is where the highest gradients are induced. Particle motion can be mostly attributed to EK when the particles are not at points of constriction in the microfluidic device, hence particle movement can be approximated by the electric field lines (Eq. 4).

Trapping of analytes occurs when the particle velocity along the field line is zero, $\vec{j} \cdot \vec{E} = 0$, such that $\vec{v}_{DEP}$ is equal to $\vec{v}_{EK}$. Trapping of analytes can therefore be described using the EK and DEP mobilities:

$$(\mu_{EK}\vec{E} + \mu_{DEP}\nabla|\vec{E}|^2) \cdot \vec{E} > 0 \qquad (5)$$

Eq. 7 can be rearranged such that dielectrophoretic trapping is described as:[58]

$$\frac{\nabla|\vec{E}|^2}{E^2} \cdot \vec{E} \geq \frac{\mu_{EK}}{\mu_{DEP}}$$

For streaming and sorting DEP the threshold for trapping is never achieved, but the particles are influenced by DEP (Eq. 4).

EK and DEP result in extremely complex systems, however the behavior can be classified as either streaming or trapping behaviors. Trapping behaviors occur when the interaction between the $\vec{E}$ and the slope of $$\frac{\nabla|\vec{E}|^2}{E^2} \cdot \vec{E}$$

meet at highly acute angles. Streaming DEP occurs where the $\vec{E}$ and the slope of $$\frac{\nabla|\vec{E}|^2}{E^2} \cdot \vec{E}$$

interact at glancing angles.

Microchannel Geometries

Figure 3:
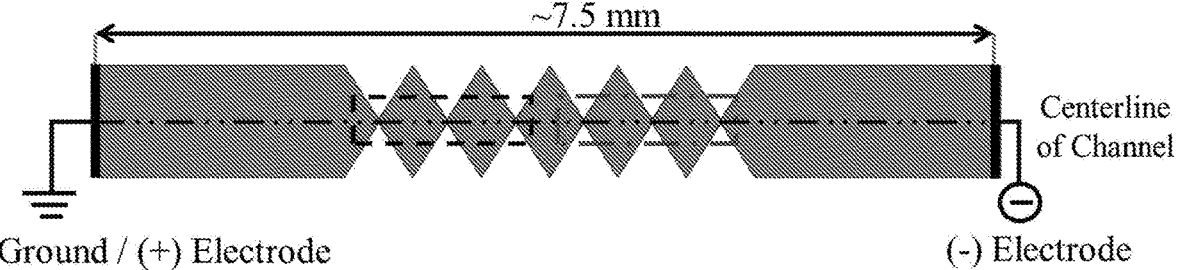
FIG. 3 shows an illustration of an enlarged sample schematic for one of the iDEP devices modelled and investigated computationally. The approximate length of the channel and the constrictions were consistent for all models. The gate pitch of the first three gates is 36.37 μm and 34.10 μm for the second set of three gates. The only exception is for the Inverse 20× Curve where the channel was about 12 mm long.

Six constriction microchannels with various insulators were used in this study, where the gate pitch changed after 3 gates, resulting in 2 gate groupings. The gate pitches were 36.37 μm and 34.10 μm (FIG. 3). The gate pitches were chosen to mimic measurements for a current channel design. The current channel measurements have been used for the manipulation and separation of several analytes including: polystyrene spheres, red blood cells, different serotypes of *Escherichia coli*, and different strains of *Staphylococcus epidermidis*.[1, 8, 11, 38] The channels modeled ranged in length from 7.5-12 mm (only the Inverse 20× Curve channels were on the upper end of this). Suitably, the length of the channel can be longer or shorter than 7.5-12 mm depending on the other parameters selected. A 500 V potential was applied so that the inlet wall was a ground and the outlet wall carried the potential (FIG. 3). AutoCAD 2014 (Autodesk, Inc, San Rafael, CA) was used to build the to-scale microchannels.

Figure 2:
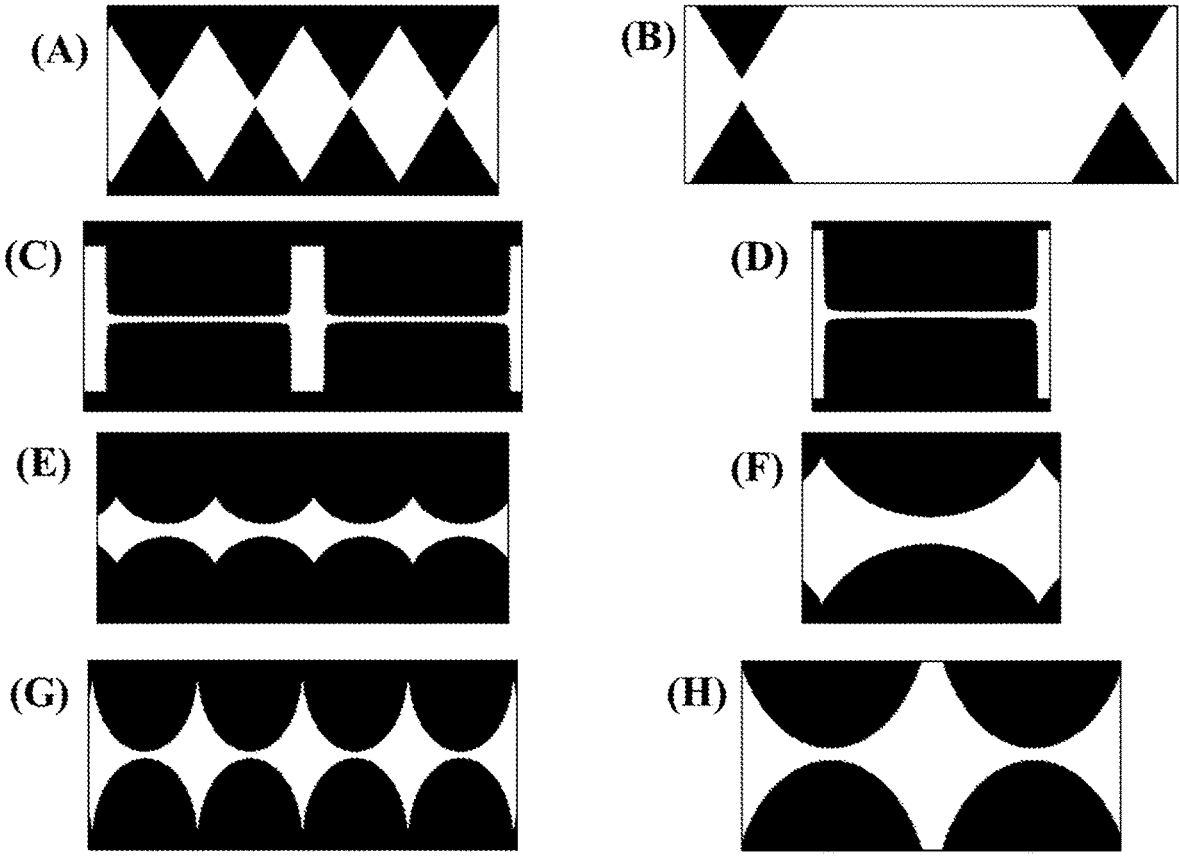
FIG. 2A-H show illustrations of different examples of base insulators (2A, 2C, 2E, and 2G) and representative zoom in views of several insulators (2B, 2D, 2F, 2H) at the points of constriction in the microchannel.
Figure 4:
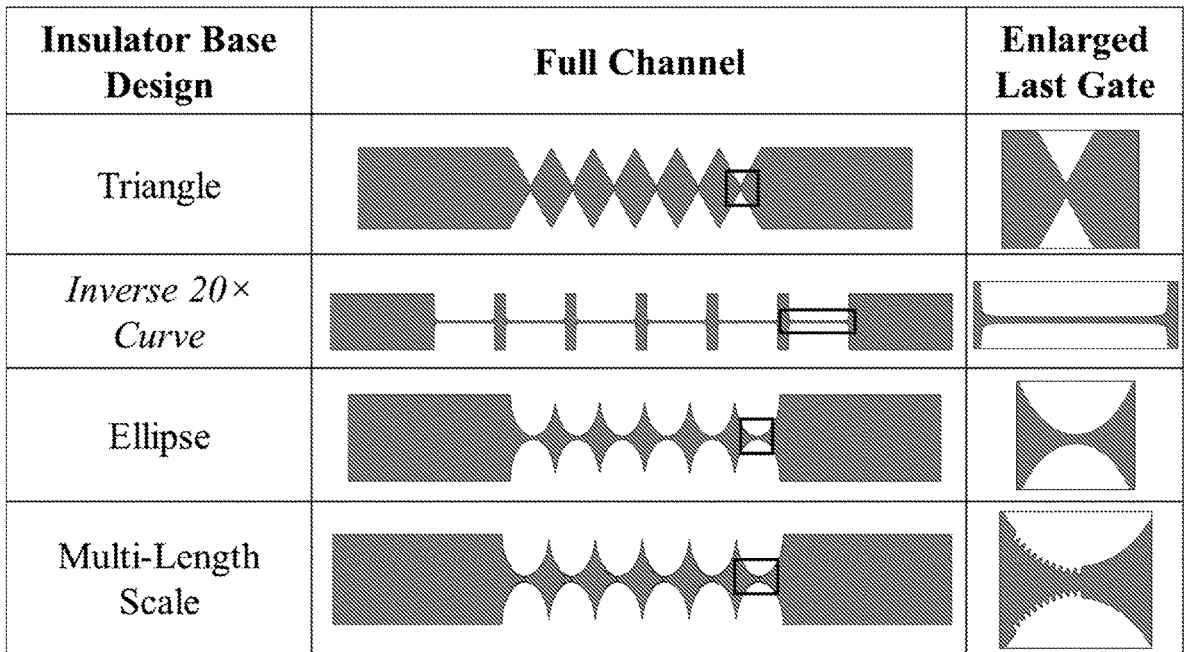
FIG. 4 shows illustrations of generalized form of channels investigated computationally. Schematics of the some of the various insulator shapes and an enlarged view of the last gate is depicted.
Figure 5:
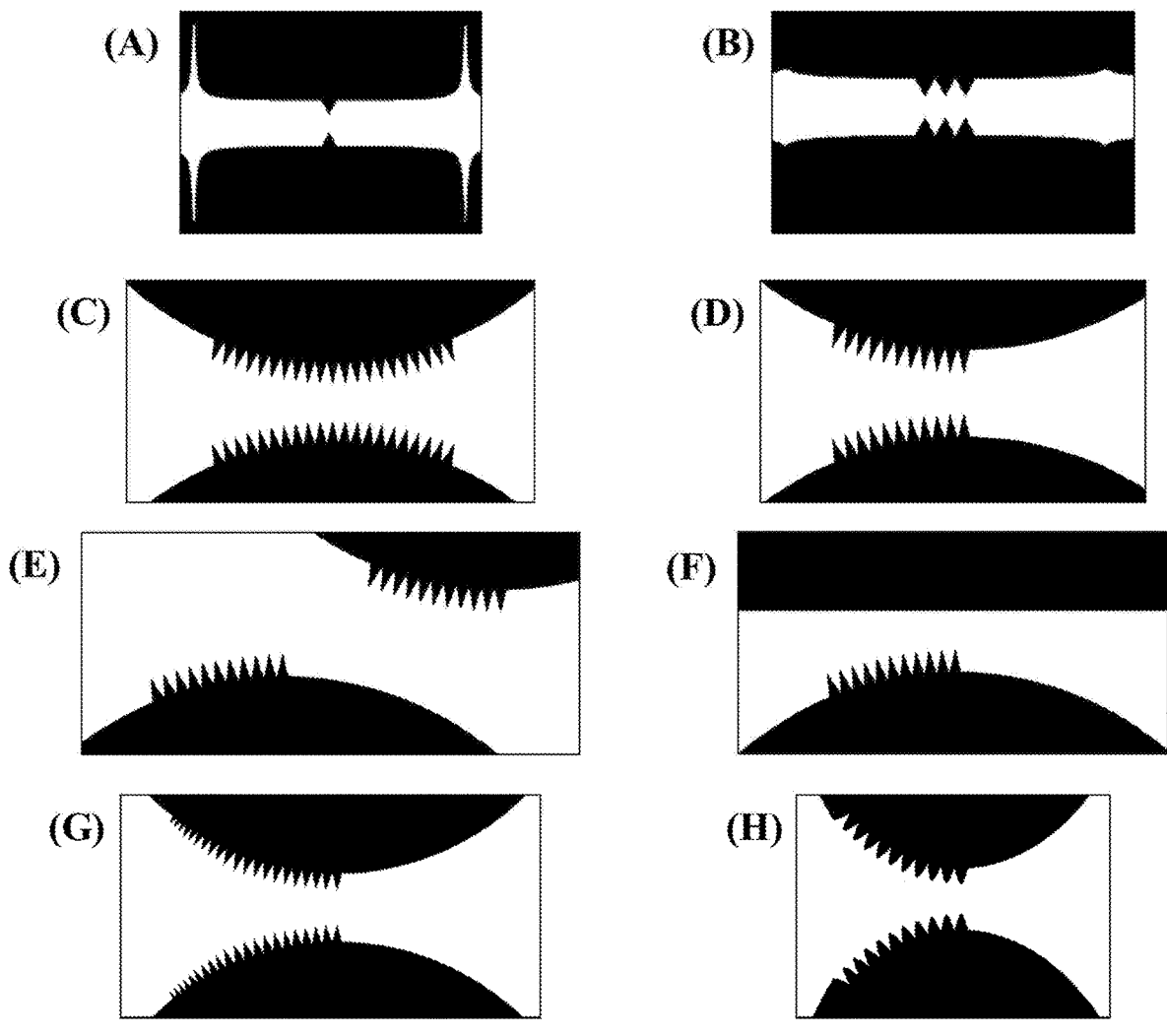
FIG. 5A-H show examples of various insulators tested where all of the small insulators are 20 μm tall at the point of greatest constriction. (A) Inverse 20× Curve base insulator with 1 small triangle insulator. (B) Inverse 20× Curve base insulator with 3 small triangular insulators. (C) Circle base insulator with ellipse small insulators across the whole top of the insulator. (D) Circle base insulator with ellipse small insulators across half the top, were the last small insulator is the point of greatest constriction. (E) Circle base insulator with ellipse small insulators such that the last small insulators on both side of the microchannel are offs set by 200 μm (F) Circle base insulator with ellipse small insulators where the wall of the microchannel is the other side of the constriction. (G) Circle base insulator with small ellipse insulators that diminish in size the further from the point of greatest constriction. (H) Ellipse based insulator with small elliptical insulators that are inset into the base insulator.

Insulator geometries were modeled to determine their effects on the applied electric potential. The insulator geometries focused on the following features: the effect of sharp features (triangular shape), flat designs (Inverse 20× Curve and rectangular insulators), rounded insulators (circular and elliptical shapes), and the addition of small insulator features to larger geometry elements near or at the point of highest constriction (FIG. 4). Several manipulations to the small insulating features were tested. Examples of these manipulations include: changing the height (ex. 20-30 μm), diminishing the insulator height, in-setting them into the base insulator, changing the width, increasing and decreasing the number of small insulators, altering the distribution of small insulators (over half the top or the full top of the base insulator), changing the shape (triangles, rectangles, curved fins, and ellipses). A sampling of these different geometries can be found in the Supplementary Material (FIG. 2 & FIG. 5).

Fabrication limitations were not considered when testing the different variations of the multi-length scale designs. However, the multi-length scale insulator design developed and discussed was designed to adhere to following current fabrication limitations. The photomask has a tolerance for the critical dimension of 0.3 μm±10% with a maximum tolerance of 0.6 μm.[59] For the photomask the resolution over a 5.0 cm channel is 1.5 μm.[59] Wafers were made using standard photolithographic techniques; specifically using the photoresist AZ 3312 (AZ Electronic Materials) which can be used to create features less than 0.50 μm.[60] A microchannel depth of 20 μm with minimum feature size of a 2 μm is achievable using a Surface Technology Systems Deep Silicon Etch, which utilizes $SF_6$, $C_4F_8$, and $O_2$ to etch using the Bosch process for an anisotropic etch.[61] Therefore the final multi-length scale insulator shape discussed in this example was developed with a minimum critical dimension of 2.5 μm.

Finite Element Multiphysics Mathematical Models

The distribution of the electric potential was modeled using the finite-element multiphysics simulation software (COMSOL Multiphysics 5.1). The AC/DC module was specifically used to determine the distribution of the $\vec{E}$, $\nabla|\vec{E}|^2$, and $$\frac{\nabla|\vec{E}|^2}{E^2} \cdot \vec{E}.$$

Two dimensional models of the microchannels were utilized as the electric potential is expected to vary minimally across the channel depth as the channels are relatively shallow compared to the other dimensions of the microchannel.[58] The insulating posts will distort the electric field of the entire depth of the microchannel as they are they full height of the microchannel. The same material properties and element size parameters were used for all microchannels for original comparison. The mesh was refined further for all designs developed herein.

The distribution of the electric potential in all microchannels was determined using the Laplace equation, where the electric potential (φ) within a microchannel is continuous:

$$\nabla^2\varphi = 0 \qquad (7)$$

The boundaries are defined as the surfaces of the microchannel and insulators where the boundary conditions applied are as follows:

$$\vec{n} \cdot \vec{j} = 0 \text{ at the boundaries} \qquad (8)$$

$$\varphi = V_{inlet} \qquad (9)$$

$$\varphi = V_{outlet} \qquad (10)$$

where $\vec{n}$ is the normal vector from the surface, $\vec{j}$ is the electrical current density, and $V_{inlet}$ and $V_{outlet}$ are the potentials applied at the inlet and outlet of the microchannel.

RESULTS AND DISCUSSION

The shape of insulators in iDEP is the defining attribute towards the ability to manipulate analytes within a microfluidic channel. The insulator induces the distribution of $\vec{E}$ and therefore the $\nabla|\vec{E}|^2$ and the streaming or trapping of the analyte. For trapping, streaming, and sorting it is desirable for each particle of a given physical makeup to experience the same environment to ensure consistent outcomes. Dielectrophoretic forces must be high enough to overcome transport and diffusional forces to generate an observable effect. This requires large gradients, resulting in large $\nabla|\vec{E}|^2$ values.[1, 12]

Depending on the geometric configuration and strength of the various forces, streaming or trapping can result. Sorting of particles in a continuous or semi-continuous mode has been an important use of dielectrophoresis. A common strategy is deflection using streaming DEP, but recent work has shown sorting by exploiting trapping or trapping-like mechanisms. For deflection techniques to operate most efficiently, similar principles apply, in that, all particles of a population should occupy a homogenous environment during the deflection process. This suggests that each particle is influenced by the same $$\frac{\nabla|\vec{E}|^2}{E^2} \cdot \vec{E}$$

value at each point in the process.

The two features can be at odds with one another, by definition gradient means a change in the value and homogeneous suggest a consistent level. This study probes a large variety of insulator shapes to create an environment where high gradient values are attained, while giving a homogeneous environment to all particles exposed to the separatory system.

Figure 6:
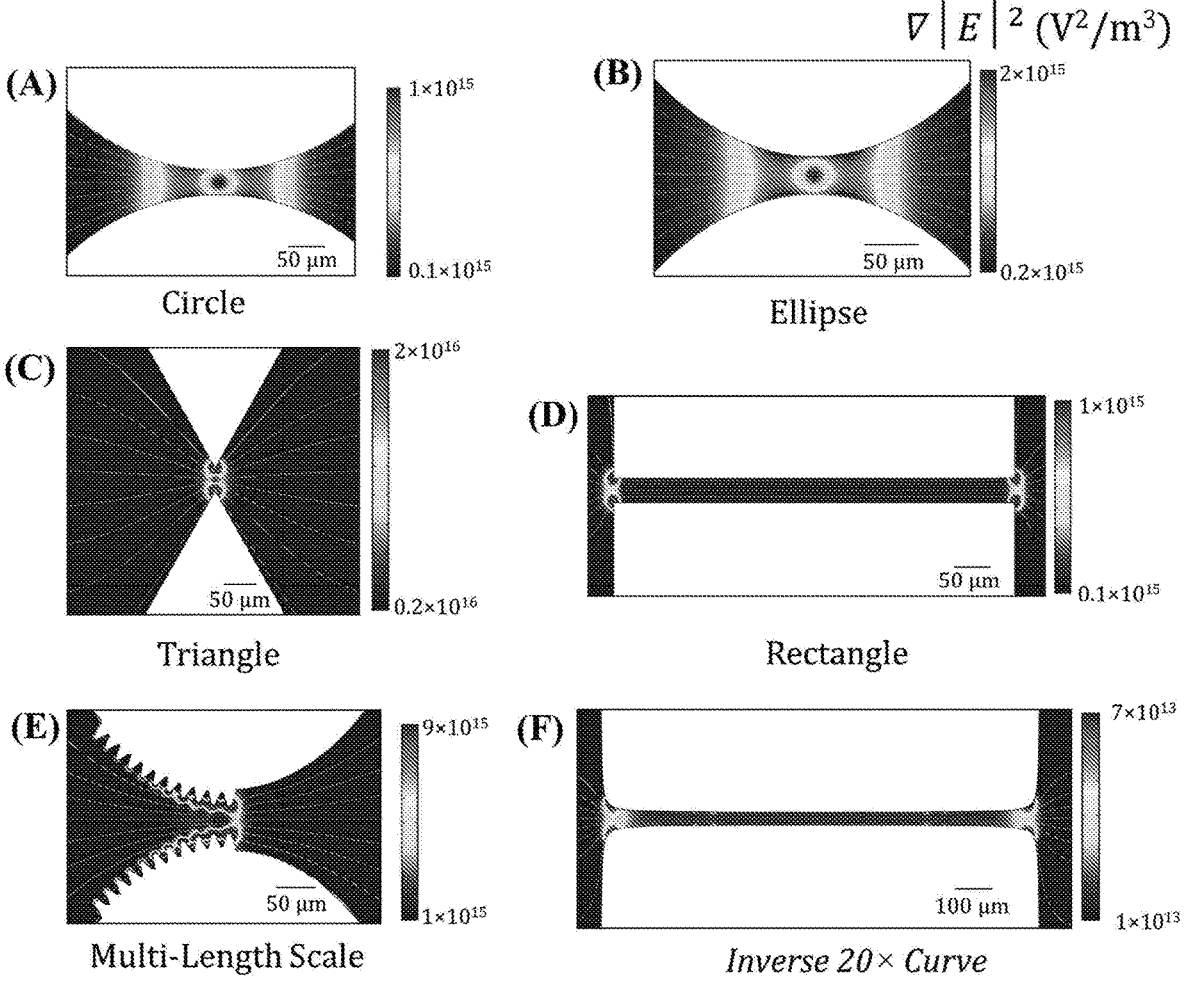
FIG. 6A-F shows general design options. Two dimensional plots of the $\nabla|\vec{E}|^2$ for different insulator shapes with electric field lines (grey). The absolute value for the color scale for each design is different to highlight the patterns that result from the specific insulator shape. Each image is of the first gate of 34.10 μm for the different designs.

The following geometric constructs were probed. The effect of different base insulators: triangle, rectangle, Inverse 20× Curve, circle, and ellipse (FIG. 6). Furthermore the addition of small insulators to the base structure was tested; variables included the shape of the small insulator(s) (triangle, ellipse, rectangle, and curved fin), number of small insulator(s), location on the base insulator (across the whole top or half, insetting the insulators in the base insulator), and the dimensions of the small insulators (height, width variations at base and top). Examples of these different tested geometries can be found in the Supplimentary Information (FIG. 5). All of these geometries were eliminated based on one or more of the following factors: not achieving high enough $\nabla|\vec{E}|^2$ inefficient streaming (presence of local traps) of analytes, and/or severe lateral field inhomogeniety. The multi-length scale insulator developed further was optimized to adhere to the fabrications limitation outline noted.

To achieve high $\nabla|\vec{E}|^2$ the most effective insulator design has sharp points, demonstrated by the triangular insulator (FIG. 6C). The radius of curvature for sharp features changes rapidly which, in turn, constricts the electric field and results in a high $\nabla|\vec{E}|^2$. The triangular insulator is representative of diamonds, sawteeth, and triangles used for insulators.[11, 23, 28, 31, 38, 39, 41] Along the centerline, the value for the gradient of the $\nabla|\vec{E}|^2$ is for the 34.10 μm gate is approximated to be $3.2\times10^{16}$ V$^2$/m$^3$, which is the highest value of any of the insulator shapes examined. Particles will travel along the field line by EK forces in the absence of a significant gradient. However, these sharp features create local dielectrophoretic traps where the electric field line impinges the slope of the local gradient at an acute angle. This is seen at the lateral pathlines away from the centerline for these triangle designs, which are representative of this class of insulator shapes. In cases where trapping does not occur, particles are deflected in a highly non-linear fashion preventing consistent separations via deflection and streaming.

Circular insulators have smaller gradients (FIGS. 6A & B) as the constriction of the electric field is more gradual as compared to triangular insulators. Therefore only smaller $\nabla|\vec{E}|^2$ values are possible with the same constriction size compared to sharp insulators. The $\nabla|\vec{E}|^2$ along the centerline is $8.8\times10^{14}$ and $1.85\times10^{15}$ V$^2$/m$^3$ for the circular and ellipse shaped insulators respectively with a gate pitch of 34.10 μm.

Rectangular insulators are also used to alter the gradient of the electric field (FIG. 6D).[14, 37] The maximum $\nabla|\vec{E}|^2$ along the centerline is $6.3\times10^{14}$ V$^2$/m$^3$ with a gate pitch of 34.10 μm. The gradient for rectangular and Inverse 20× Curve insulators (FIGS. 6 D & F) are smaller than for circular and triangular insulators as the constriction of the electric field is abrupt, so a high gradient is limited to the corners of the insulators. These values are the lowest of any insulator shape, this could be increased by shortening the insulator or channel, however the $\nabla|\vec{E}|^2$ will still be lower than the other designs, leading to less influence on the particles in the channel.

Figure 1:
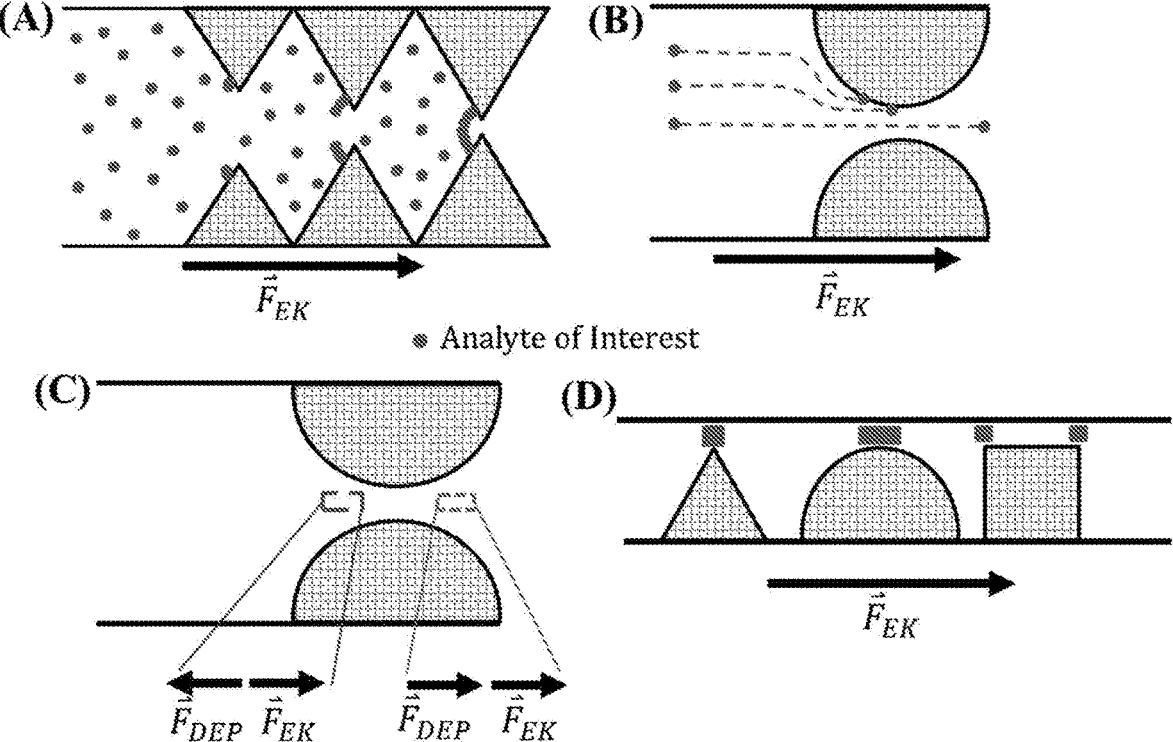
FIG. 1A-D show general illustrations showing similar physical processes regardless of insulator geometry. For the purposes of this illustration, the bulk electrokinetic movement ($\vec{F}_{EK}$) for all the channels is from left to right. For (A) and (B) the blue spheres represent a single population of identical particles of interest experiencing negative dielectrophoresis (nDEP). (A) Typical g-iDEP behavior, where some analytes are trapped near the point of greatest constriction at larger pitches before complete full cross section sequestration occurs. (B) Identical particles experience different outcomes depending on initial path line. In some cases, particles on centerline can traverse the gate, whereas those near the wall will be trapped. This results in like-particles being distributed throughout a range of gate pitches. (C) Near-centerline summation of forces for left-to-right $\vec{F}_{EK}$ and negative dielectrophoresis. (D) Various insulator shapes that are currently used that all allow variation in like-particle behavior depending on initial path line. Blue rectangles depict the point of strongest DEP interaction for a particle in a DC field.

The $\nabla|\vec{E}|^2$ is not the same laterally for the triangular, circular, and rectangular insulators, so that particles will experience different forces based on their initial pathlines. Within each of these designs, particles starting at various vertical positions (as drawn, lateral position relative to the longitudinal axis of the device and applied external electric field) will be trapped at widely varying locations (FIG. 1), meaning that trapping DEP will not occur at the same voltage for the different analyte pathlines.[45, 46] The rectangular and Inverse 20× Curve have the most laterally homogeneous electric field, however they do not have a strong enough gradient to trap analytes of typical interest.[12] For the case of sorting DEP methods having a low $\nabla|\vec{E}|^2$ will result in lower resolution separations as particles will not be deflected as much. This is compounded by the fact that like-particles along different pathlines will experience different forces, altering their deflection and thus the resolution of the separation. Streaming DEP is also affected by having low $\nabla|\vec{E}|^2$ values, and thus lower DEP forces, therefore the particles are not as effectively streamlined. The effects of inhomogeneous lateral fields are similar to the wall effect in chromatography, which results in lower resolution separations.[62]

The advantage to multi-length scale design is the small insulators alter the distribution of the electric field significantly at the points approaching the constriction resulting in higher values for the $\nabla|\vec{E}|^2$, while the elliptical base creates a more homogenous lateral field. As the particles approach the point of constriction, under conditions of negative DEP, the analytes are pushed towards the center of the microchannel as they are repelled from the small insulators. The most useful insulator design from this study has an elliptically-shaped base insulator and small 20 μm-tall elliptically-shaped insulators across half the top of the base (FIG. 6E).

The $\nabla|\vec{E}|^2$ at the 34.10 μm gate pitch is $1.7\times10^{15}$ V$^2$/m$^3$. This value is lower than for the triangular insulators, but higher than any of the other insulators.

All further comparisons made are between a triangular insulator, an elliptical insulator, and the new multi-length scale insulator. The triangular and elliptical insulator represents issues of partial trapping and an inhomogeneous lateral environment present for all other designs (circle and rectangle) and the triangular insulator has the highest $\nabla|\vec{E}|^2$ along the centerline. The elliptical insulator is also used for comparison to determine the effects of the addition of the small insulators for the multi-length insulator. Using the definition of trapping in an iDEP device defined in Eq. 4 particles are trapped based on the ratio of the $\mu_{EK}$ and $\mu_{DEP}$. Using a known analyte (*Escherichia coli*), an established value for $\mu_{EK}$ is $-1.0\times10^{-8}$ m$^2$/Vs[8] and the dielectrophoretic mobility can be calculated assuming the particle is between 0.1-1.0 μm, using the following relationship:[12]

$$\mu_{DEP} = \frac{\varepsilon_m r^2 f_{CM}}{3\eta} \tag{12}$$

where media permittivity ($\varepsilon_m$) is $10^{-9}$ F/m, the radius of the particle (r) is $10^{-6}$ to $10^{-7}$ m, $f_{CM}$ is $-0.3$, and solution viscosity ($\eta$) is $10^{-3}$ Ns/m$^2$.[12] this gives a range for $\mu_{DEP}$ of $1.0\times10^{-17}$ to $-1.0\times10^{-19}$ m$^4$/V$^2$s. Therefore a range for the ratio of mobilities is $-1.0\times10^9$ V/m$^2$ to $1.0\times10^{11}$ V/m$^2$. These values reasonably coincides with the value determined for *Staphylococcus epidermidis* of $4.6\pm0.6\times10^9$ V/m$^2$ for gentamicin resistant and $9.2\pm0.4\times10^9$ V/m$^2$ for gentamicin sensitive.[11]

Figure 7:
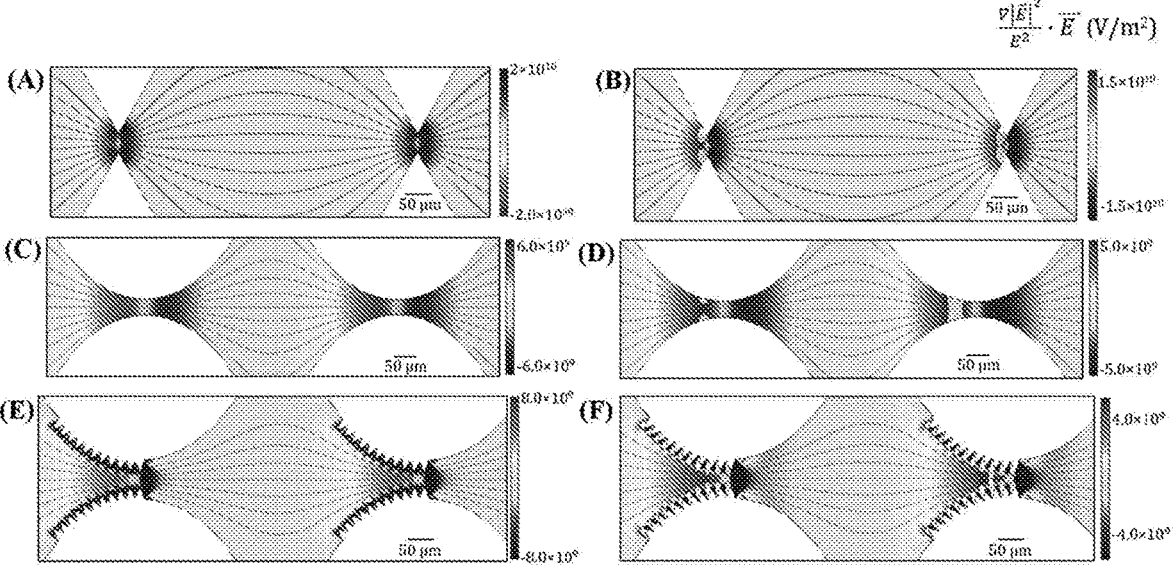
FIG. 7A-F shows a study emphasizing differences between triangular, ellipse, and multi-length scale insulators at the critical transition to full trapping at second gate (non-trapping at left, trapping at right, panels B & D). Similar data in all six panels, with different representations to emphasize various transport and trapping features. Panels B, D, & F illustrates the area that is accessible (colored region) to a particle that would be repelled (nDEP) with a given particle property ($\mu_{EK}/\mu_{DEP}$: $1.8\times10^{10}$ V/m$^2$—triangle, $5.4\times10^9$ V/m$^2$—ellipse, and $5.6\times10^9$ V/m$^2$—multi-length scale). Panels A, C, & E are the full distribution of $$\frac{\nabla |\vec{E}|^2}{E^2} \cdot \vec{E}.$$

A direct visual 2D comparison of $$\frac{\nabla|\vec{E}|^2}{E^2}\cdot\vec{E}$$

within the three designs provides evidence for significantly different behaviors (FIG. 7). The full range of $$\frac{\nabla|\vec{E}|^2}{E^2}\cdot\vec{E}$$

values depicts that a triangular insulator achieves the highest values followed by the multi-length scale and then elliptical insulator (FIGS. 7A, 7C, & 7E). In these representations, the intensity of the $$\frac{\nabla|\vec{E}|^2}{E^2}\cdot\vec{E}$$

value is plotted showing effect on a particle with a various mobility ratios. Specific ratios were utilized as the various shapes with the same constrictions and voltage applied will trap particles with ratios between $5.4\times10^9$ and $1.7\times10^{10}$ V/m$^2$ (FIGS. 7B, 7D, & 7F). The ratios were chosen to depict potential trapping conditions specific to the applied voltage, insulator shape, and gate pitch. A ratio of $5.6\times10^9$ V/m$^2$ was selected for the multi-length scale design selected to show trapping behavior at a slightly narrower gate (right) and complete passage of all particles at the wider gate (left) for the multi-length scale design (FIG. 7F). The color scale toward red is the most repelling environment and the white areas completely exclude analytes with these properties. The portions with color define the area accessible to this analyte. This can be observed by noting that the white area completely bridges the gap on the right gate, indicating excluded area and trapping behavior.

Significantly different behaviors can be deduced for the triangular and ellipse insulators (FIGS. 7A, 7B, 7C, & 7D). For particles off the centerline, the electrokinetic pathlines impinge upon the gradient at an acute angle, allowing for partial trapping at wider gates (FIGS. 7B & 7D). At the top (or bottom) the pathlines clearly impinge on the slope of the $$\frac{\nabla|\vec{E}|^2}{E^2}\cdot\vec{E}$$

at an acute angle. When full trapping across the gate occurs, an arc forms represented by the left edge of the white areas (FIGS. 7B & 7D). This arc structure has been observed in many experimental systems and is demonstrated computationally (FIGS. 8A, 8B, 8C, & 8D).[1, 3, 8-11, 41, 46, 63] The net result is consistent with current experimental systems, where small collections of analytes are observed close to the point of greatest constriction of wide gates and full arcs form when complete trapping across the lateral dimension occurs. For a single particle population, some particles will trap on these wide gates, while other will continue on, which distributes that single population throughout the device.

The reason the multi-length scale system prevents these local traps at wide gates is the slope of the $$\frac{\nabla|\vec{E}|^2}{E^2}\cdot\vec{E}$$

impinges upon the electrokinetic lines at a glancing angles and simply streams particles that experience negative DEP toward the centerline. For the left larger gate particles not on the centerline will impinge upon the white space (inaccessible area) first and be deflected towards the centerline, as this does not occur at highly acute angles necessary for trapping. As the particles interact with an inaccessible area first, and are deflected towards the centerline they will not interrogate the local minima between the small insulators (FIG. 7F). If the centerline trapping forces are insufficient, no trapping occurs at that gate.

Predicted trapping locations for the different designs were determined, based on different mobilities ratio. For both the triangular and elliptically shaped insulators partial trapping is seen at the 36.37 μm gate (FIGS. 8A & 8C), while no trapping is seen for multi-length insulator (FIG. 8F). Complete trapping of an analyte is seen for all insulator shapes at the 34.10 μm gate (FIGS. 8B, 8D, & 8F). These results for the common insulator shapes agree with what many groups have seen computationally and experimentally.[9, 35, 41, 58]

One feature which promises improved results beyond the removal of local traps is that the assessable area limits the lateral variation in $$\frac{\nabla |\vec{E}|^2}{E^2} \cdot \vec{E}.$$

At a trapping location (FIG. 8F), the values are relatively constant across the entire gap. This is a direct result of the streamlining such that at the third small tooth (starting at the point of constriction working left) the channel width is 42.80 μm, however the accessible area to the analyte is only about 30 μm (FIG. 8F). The particles are deflected towards the centerline of the channel, such that they will not interrogate the space close to the top or between the small insulators.

For sorting and streaming techniques the forces are more uniform laterally with the multi-length scale insulator meaning that the particles will be repelled or deflected in more a similar manner. These will ultimately lead to higher resolution separations as particles are deflected the same amount and better streaming will occur as the particles will be confined to a smaller area in the channel than with the other designs.

Conclusion

The development of a new multi-length scale insulator for iDEP will allow for improved separations for both deflection and trapping techniques. The new insulator will streamline the analytes to ensure that like-particles experience similar environments as the $\vec{E}$ is more homogenous in the accessible area. Furthermore, the minimization of partial and extraneous trapping should be possible. This can all be accomplished while maintaining $$\frac{\nabla |\vec{E}|^2}{E^2} \cdot \vec{E}$$

values high enough to accomplish trapping.

Conclusion

The development of a new multi-length scale insulator for iDEP will allow for improved separations for both deflection and trapping techniques. The new insulator will streamline the analytes to ensure that like-particles experience similar environments as the $\vec{E}$ is more homogenous in the accessible area. Furthermore, the minimization of partial and extraneous trapping should be possible. This can all be accomplished while maintaining $$\frac{\nabla |\vec{E}|2}{E^2} \cdot \vec{E}$$

values high enough to accomplish trapping.

Each publication, patent, and patent publication cited in this disclosure is incorporated in reference herein in its entirety. The present invention is not intended to be limited to the foregoing examples, but encompasses all such modifications and variations as come within the scope of the appended claims.

REFERENCES

[1] Jones, P. V., Staton, S. J. R., Hayes, M. A., *Anal. Bioanal. Chem.* 2011, 401, 2103-2111.

[2] Luo, J., Abdallah, B. G., Wolken, G. G., Arriaga, E. A., Ros, A., *Biomgb* 2014, 8, 021801.

[3] Staton, S. J. R., Jones, P. V., Ku, G., Gilman, S. D., Kheterpal, I., Hayes, M. A., *Analyst* 2012, 137, 3227-3229.

[4] Nakano, A., Camacho-Alanis, F., Ros, A., *Analyst* 2015, 140, 860-868.

[5] Washizu, M., Kurosawa, O., *IEEE T. Ind. Appl.* 1990, 26, 1165-1172.

[6] Chou, C.-F., Tegenfeldt, J. O., Bakajin, O., Chan, S. S., Cox, E. C., Darnton, N., Duke, T., Austin, R. H., *Biophys. J.* 2002, 83, 2170-2179.

[7] Martinez-Duarte, R., Camacho-Alanis, F., Renaud, P., Ros, A., *Electrophoresis* 2013, 34, 1113-1122.

[8] Jones, P. V., DeMichele, A. F., Kemp, L., Hayes, M. A., *Anal. Bioanal. Chem.* 2014, 406, 183-192.

[9] Lapizco-Encinas, B. H., Simmons, B. A., Cummings, E. B., Fintschenko, Y., *Anal. Chem.* 2004, 76, 1571-1579.

[10] Lapizco-Encinas, B. H., Simmons, B. A., Cummings, E. B., Fintschenko, Y., *Electrophoresis* 2004, 25, 1695-1704.

[11] Jones, P. V., Hilton, S. H., Davis, P. E., Yanashima, R., McLemore, R., McLaren, A., Hayes, M. A., *Analyst* 2015, 140, 5152-5161.

[12] Jones, P. V., Hayes, M. A., *Electrophoresis* 2015, 36, 1098-1106.

[13] Abdallah, B. G., Chao, T.-C., Kupitz, C., Fromme, P., Ros, A., *ACS Nano* 2013, 7, 9129-9137.

[14] Srivastava, S. K., Baylon-Cardiel, J. L., Lapizco-Encinas, B. H., Minerick, A. R., *J. Chromatogr. A* 2011, 1218, 1780-1789.

[15] Hughes, M. P., Morgan, H., Rixon, F. J., Burt, J. P. H., Pethig, R., *BBA-Gen Subjects* 1998, 1425, 119-126.

[16] Crane, J. S., Pohl, H. A., *J. Electrochem. Soc.* 1968, 115, 584-586.

[17] Pohl, H. A., Crane, J. S., *Biophys. J.* 1971, 11, 711-727.

[18] Hoettges, K. F., Hughes, M. P., Cotton, A., Hopkins, N. A. E., McDonnell, M. B., *IEEE Eng. Med. Bio.* 2003, 22, 68-74.

[19] Johari, J., Hübner, Y., Hull, J. C., Dale, J. W., Hughes, M. P., Phys. Med. Biol. 2003, 48, N193.

[20] Morgan, H., Hughes, M. P., Green, N. G., *Biophys. J.* 1998, 77, 516-525.

[21] Hughes, M. P., Morgan, H., *Anal. Chem.* 1999, 71, 3441-3445.

[22] Hughes, M. P., *Electrophoresis* 2002, 23, 2569-2582.

[23] Chen, K. P., Pacheco, J. R., Hayes, M. A., Staton, S. J. R., *Electrophoresis* 2009, 30, 1441-1448.

[24] Chaurey, V., Polanco, C., Chou, C.-F., Swami, N. S., *Biomicrofluidics* 2012, 6, 012806.

[25] Swami, N., Chou, C.-F., Ramamurthy, V., Chaurey, V., *Lab Chip* 2009, 9, 3212-3220.

[26] Su, Y.-H., Tsegaye, M., Varhue, W., Liao, K.-T., Abebe, L. S., Smith, J. A., Guerrant, R. L., Swami, N. S., *Analyst* 2014, 139, 66-73.

[27] Gencoglu, A., Camacho-Alanis, F., Nguyen, V. T., Nakano, A., Ros, A., Minerick, A. R., *Electrophoresis* 2011, 32, 2436-2447.

[28] Cummings, E. B., Singh, A. K., *Anal. Chem.* 2003, 75, 4724-4731.

[29] Srivastava, S., Gencoglu, A., Minerick, A., *Anal. Bioanal. Chem.* 2011, 399, 301-321.

[30] Keshavamurthy, S. S., Leonard, K. M., Burgess, S. C., Minerick, A. R., *NSTI-Nanotech, Boston, MA* 2008, 401-404.

[31] Kang, Y., Li, D., Kalams, S., Eid, J., *Biomed. Microdevices* 2008, 10, 243-249.

[32] Barbulovic-Nad, I., Xuan, X., Lee, J. S. H., Li, D., *Lab Chip* 2006, 6, 274-279.

[33] Thwar, P. K., Linderman, J. J., Burns, M. A., *Electrophoresis* 2007, 28, 4572-4581.

[34] Lapizco-Encinas, B. H., Davalos, R. V., Simmons, B. A., Cummings, E. B., Fintschenko, Y., *J. Microbiol. Methods* 2005, 62, 317-326.

[35] Sabounchi, P., Morales, A., Ponce, P., Lee, L., Simmons, B., Davalos, R., *Biomed. Microdevices* 2008, 10, 661-670.

[36] Regtmeier, J., Duong, T. T., Eichhorn, R., Anselmetti, D., Ros, A., *Anal. Chem.* 2007, 79, 3925-3932.

[37] Kang, K. H., Kang, Y., Xuan, X., Li, D., *Electrophoresis* 2006, 27, 694-702.

[38] Staton, S. J. R., Chen, K. P., Taylor, T. J., Pacheco, J. R., Hayes, M. A., *Electrophoresis* 2010, 31, 3634-3641.

[39] Pysher, M. D., Hayes, M. A., *Anal. Chem.* 2007, 79, 4552-4557.

[40] Gallo-Villanueva, R. C., Rodríguez-López, C. E., Diaz-de-la-Garza, R. I., Reyes-Betanzo, C., Lapizco-Encinas, B. H., *Electrophoresis* 2009, 30, 4195-4205.

[41] LaLonde, A., Gencoglu, A., Romero-Creel, M. F., Koppula, K. S., Lapizco-Encinas, B. H., *Journal of Chromatogr. A* 2014, 1344, 99-108.

[42] Cummings, E. B., *IEEE Eng. Med. Bio.* 2003, 22, 75-84.

[43] Srivastava, S. K., Artemiou, A., Minerick, A. R., *Electrophoresis* 2011, 32, 2530-2540.

[44] Abdallah, B. G., Roy-Chowdhury, S., Coe, J., Fromme, P., Ros, A., *Anal. Chem.* 2015, 87, 4159-4167.

[45] Gallo-Villanueva, R. C., Sano, M. B., Lapizco-Encinas, B. H., Davalos, R. V., *Electrophoresis* 2014, 35, 352-361.

[46] Saucedo-Espinosa, M. A., Lapizco-Encinas, B. H., *Electrophoresis* 2015, 36, 1086-1097.

[47] Giddings, J. C., *Unified Separation Science*, John Wiley & Sons, Inc., New York 1991.

[48] Morton, K. J., Loutherback, K., Inglis, D. W., Tsui, O., K., Sturm, J. C., Chou, S. Y., Austin, R. H., *P. Natl. Acad. Sci. USA* 2008, 105, 7434-7438.

[49] Huang, L. R., Cox, E. C., Austin, R. H., Sturm, J. C., *Science* 2004, 304, 987-990.

[50] Streek, M., Schmid, F., Duong, T. T., Ros, A., *J. Biotech.* 2004, 112, 79-89.

[51] Ros, A., Hellmich, W., Regtmeier, J., Duong, T. T., Anselmetti, D., *Electrophoresis* 2006, 27, 2651-2658.

[52] Ozuna-Chacón, S., Lapizco-Encinas, B. H., Rito-Palomares, M., Martinez-Chapa, S. O., Reyes-Betanzo, C., *Electrophoresis* 2008, 29, 3115-3122.

[53] Pohl, H. A., *Dielectrophoresis: the behavior of neutral matter in nonuniform electric fields*, Cambridge University Press, Cambridge; New York 1978.

[54] Pethig, R., *Biomicrofluidics* 2010, 4, 022811.

[55] Probstein, R. F., *Physicochemical Hydrodynamics: An Introduction*, John Wiley & Sons, Inc. 1994, pp. 1-8.

[56] Jones, T. B., *Electromechanics of Particles*, Cambridge University Press 1995.

[57] Kwon, J.-S., Maeng, J.-S., Chun, M.-S., Song, S., *Microfluid Nanofluidics* 2008, 5, 23-31.

[58] Baylon-Cardiel, J. L., Lapizco-Encinas, B. H., Reyes-Betanzo, C., Chavez-Santoscoy, A. V., Martinez-Chapa, S. O., *Lab Chip* 2009, 9, 2896-2901.

[59] Dingley, J., in: Photo-Tools, J. (Ed.), JD Photo-Tools 2014, pp. 1-89.

[60] AZ Electronic Materials: AZ® 3300 Series Crossover Photoresists 2005.

[61] Bhardwaj, J., Ashraf, H., McQuarrie, A., *Proc. Symp. Microstructures and Microfabricated Systems, ECS* 1997.

[62] Shalliker, R. A., Broyles, B. S., Guiochon, G., *J. Chromatogr. A.* 2000, 888, 1-12.

[63] Staton, S. J. R., Chen, K. P., Taylor, J. P., Pacheco, J. R., Hayes, M. A., *Electrophoresis* 2010, 31, 3634-3641.

[64] Pesch, G. R., Kiewidt, L., Du, F., Baune, M., Thöming, J., *Electrophoresis*, 2016, 37, 291-301.

[65] Saucedo-Espinosa, M. A., Lapizco-Encinas, B. H., *J. Chromatogr. A.* 2015, 36, 325-333.

The citation of any document is not to be construed as an admission that it is prior art with respect to the present invention.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A multi-length scale structure for use in an insulator-based dielectrophoresis device for separating at least one analyte from a fluid, the device including a fluid flow channel disposed on a substrate, the fluid flow channel being defined by a first wall, and a second wall spaced from the first wall, the multi-length scale structure comprising:

an insulating flow structure extending from the first wall toward the second wall thereby defining a constriction in the fluid flow channel between the first wall and the second wall, the insulating flow structure comprising a base section and a plurality of projections extending from the base section toward the second wall, wherein the plurality of projections are elliptically shaped, wherein a base height of the base section is greater than a projection height of each of the plurality of projections, wherein the projection height is in a range of 50 nm to 50 μm, and wherein the plurality of projections are structured to create uniform projection heights at a plateau of greatest constriction of the insulating flow structure, and wherein the base section is elliptically shaped.

2. The multi-length scale structure of claim 1, wherein each projection has a first end at a first junction with the base section and a second end at a second junction with the base section, a length from the first end to the second end being in the range of 50 nm-100 μm.

3. The multi-length scale structure of claim 1, wherein the base section extends from an upstream junction with the first wall to a downstream junction with the first wall, and the plurality of projections only extend from the base section over a portion of a distance from the upstream junction to the downstream junction.

4. The multi-length scale structure of claim 3, wherein the plurality of projections only extend from the base section over one half or less of the distance from the upstream junction to the downstream junction.

5. A multi-length scale structure for use in an insulator-based dielectrophoresis device for separating at least one analyte from a fluid, the device including a fluid flow channel disposed on a substrate, the fluid flow channel being defined by a first wall, and a second wall spaced from the first wall, the multi-length scale structure comprising:

an insulating flow structure extending from the first wall toward the second wall thereby defining a constriction in the fluid flow channel between the first wall and the second wall, the insulating flow structure comprising a base section and a plurality of projections extending from the base section toward the second wall, wherein the plurality of projections are elliptically shaped, wherein a base height of the base section is greater than a projection height of each of the plurality of projections, wherein the projection height is in a range of 50 nm to 50 μm, and wherein the plurality of projections are structured to create uniform projection heights at a plateau of greatest constriction of the insulating flow structure, wherein the second wall includes a second insulating flow structure extending toward the first wall thereby further defining the constriction in the fluid flow channel between the first wall and the second wall, the second insulating flow structure comprising a second base section and a second plurality of projections extending from the second base section toward the first wall, and wherein the second base section is elliptically shaped and the second plurality of projections are elliptically shaped.

6. The multi-length scale structure of claim 5, wherein each of the second plurality of projections has a first end at a first junction with the second base section and a second end at a second junction with the second base section, a length from the first end to the second end being in the range of 50 nm-100 μm.

7. The multi-length scale structure of claim 5, wherein the second base section extends from an upstream junction with the second wall to a downstream junction with the second wall, and the second plurality of projections only extend from the second base section over a portion of a distance from the upstream junction to the downstream junction.

8. The multi-length scale structure of claim 7, wherein the second plurality of projections only extend from the second base section over one half or less of the distance from the upstream junction to the downstream junction.

9. A method of separating a first analyte from a second analyte, the method comprising:
   (a) providing the multi-length scale structure of claim 1; and
   (b) transporting a fluid including the first analyte and the second analyte through the constriction in the fluid flow channel.

10. A method of separating a first analyte from a second analyte, the method comprising:
   (a) providing the multi-length scale structure of claim 5; and
   (b) transporting a fluid including the first analyte and the second analyte through the constriction in the fluid flow channel.

* * * * *